US012436986B2

(12) United States Patent
Jade et al.

(10) Patent No.: US 12,436,986 B2
(45) Date of Patent: Oct. 7, 2025

(54) SYSTEMS, METHODS, AND GRAPHICAL USER INTERFACES FOR PREDICTING AND ANALYZING ACTION LIKELIHOOD

(71) Applicant: SAS INSTITUTE INC., Cary, NC (US)

(72) Inventors: Teresa S. Jade, Cary, NC (US); Julia Moreno, Glasgow (GB); Ashley Mary Beck, Lanark (GB)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/812,637

(22) Filed: Aug. 22, 2024

(65) Prior Publication Data

US 2025/0156467 A1     May 15, 2025

Related U.S. Application Data

(60) Provisional application No. 63/599,077, filed on Nov. 15, 2023.

(51) Int. Cl.
    *G06F 16/35*     (2025.01)
    *G06F 16/34*     (2019.01)
    (Continued)

(52) U.S. Cl.
    CPC .............. *G06F 16/35* (2019.01); *G06F 16/34* (2019.01); *G06F 40/284* (2020.01); *G06F 40/30* (2020.01)

(58) Field of Classification Search
    CPC ........ G06F 16/34; G06F 16/35; G06F 16/904; G06F 40/284; G06F 40/30; G06N 20/00
    See application file for complete search history.

(56) References Cited

U.S. PATENT DOCUMENTS 8,296,309 B2    10/2012   Brassil et al.
10,467,344 B1    11/2019   Jade et al.
(Continued)

OTHER PUBLICATIONS

Roser Sauri, "A Factuality Profiler for Eventualities in Text," May 2008, UMI, pp. 1-38.
(Continued)

*Primary Examiner* — Marcin R Filipczyk
(74) *Attorney, Agent, or Firm* — Padowithz Alce; Quintin Scheitlin; Alce PLLC

(57) ABSTRACT

A computer-program product obtains a text document that includes text describing an action. The computer-program product extracts one or more action tokens from the text document. The computer-program product executes a plurality of linguistic pattern searches that search the text document for one or more likelihood tokens associated with the one or more action tokens. The computer-program product classifies the action to a likelihood category associated with a respective linguistic pattern search of the plurality of linguistic pattern searches. The computer-program product classifies the text document to a respective domain. The computer-program product computes a priority value of the action described in the text document. The computer-program product generates a priority summary artifact that visually prioritizes the text document over one (Continued)

or more other text documents when the priority value of the action satisfies a predefined maximum priority threshold value.

28 Claims, 24 Drawing Sheets

(51) Int. Cl.
*G06F 40/284* (2020.01)
*G06F 40/30* (2020.01)

(56) References Cited

U.S. PATENT DOCUMENTS

| | | | |
|---|---|---|---|
| 10,699,081 | B2 | 6/2020 | Jade et al. |
| 11,423,680 | B1 | 8/2022 | Jade et al. |
| 11,501,547 | B1 | 11/2022 | Jade et al. |
| 2017/0235848 | A1* | 8/2017 | Van Dusen .......... G06Q 10/101 705/12 |
| 2017/0300565 | A1* | 10/2017 | Calapodescu ......... G06F 16/353 |
| 2022/0310264 | A1* | 9/2022 | Kaput .................... G16H 20/60 |
| 2023/0325776 | A1* | 10/2023 | Alda .................. G06Q 10/1053 705/321 |
| 2025/0037391 | A1* | 1/2025 | Nguyen ................ G06T 19/006 |

OTHER PUBLICATIONS

Cheng et al., "Actively Predicting Diverse Search Intent from User Browsing Behaviors," WWW2010, 2010, pp. 221-230.
Leo Hoye, "Adverbs and Modality in English," 1997, London and New York, pp. 1-43.
Sauri et al., "FactBank: a corpus annotated with event factuality," Lang Resources & Evaluation, May 2009, pp. 1-42.
Victoria L. Rubin, "Identifying Certainty in Texts," Research Gate, Jun. 2006, pp. 1-191.
Fernandez-Montraveta et al., "Inter-Annotator Agreement for the Factual Status of Predicates in the TAGFACT Corpus," SCOPUS, 2003. pp. 1-17.
Nicholas Sweet, "Semantic Likelihood Models for Bayesian Intference in Human-Robot Interaction," 2016, pp. 1-91.
Stefano Mizzaro, "Towards Rescursive Models—A Computational Formalism for the Semantics of Temporal Presuppositions and Counterfactuals in Natural Language," Informatica, 1997, pp. 1-19.

* cited by examiner

Example Action Token(s) Classified to Low Likelihood Category ~1522A

| | | | |
|---|---|---|---|
| met | 1518A | I dremt that we met | 1524A |
| give \| let | 1518B | I wish you'd let me give you a new laptop | 1524B |
| give | 1518C | I would love to give you some money but we have to be discreet | 1524C |
| met \| been | 1518D | If we had met I would have been so happy | 1524D |
| meet | 1518E | Wish we could meet | 1524E |
| give | 1518F | Would have loved to give it to u | 1524F |

FIG. 15F

Example Action Token(s) Classified to Intermediate Likelihood Category ~1522B

| | | | |
|---|---|---|---|
| give | 1518G | I hope you give me something good, yeah | 1524G |
| have \| see \| talk | 1518H | if I have the chance to see you we can talk about it then | 1524H |
| meet \| show | 1518I | if we meet I'll show u | 1524I |
| met \| work | 1518J | if you happen to have met me on Sunday maybe we can work something out | 1524J |
| meet | 1518K | I was planning to meet you next | 1524K |

FIG. 15G

Example Action Token(s) Classified To High Likelihood Category ~1522C

| | | | |
|---|---|---|---|
| give | 1518L | Are you going to give it to me | 1524L |
| come \| meet | 1518M | Come and meet me after school | 1524M |
| drop | 1518N | I plan to drop it off at yours | 1524N |
| give | 1518O | I'll give you a gift card | 1524O |
| meet | 1518P | Let's make plans to meet Saturday | 1524P |
| said \| meet | 1518Q | that's what I said when I met you last week | 1524Q |

FIG. 15H

| | Likelihood Category | Severity Value |
|---|---|---|
| 1522A | Low Likelihood Category | 0.2 |
| 1522B | Intermediate Likelihood Category | 0.5 |
| 1522C | High Likelihood Category | 1.0 |

FIG. 15K

| | Domain | Severity Value |
|---|---|---|
| 1525A | Domain Classification A | 0 |
| 1525B | Domain Classification B | 0.33 |
| 1525C | Domain Classification C | 0.66 |
| | ... | ... |
| 1525N | Domain Classification N | 0.99 |

FIG. 15L

| 1 | ##Past tense all subject types (when he sneezed, the dog jumped up quickly) |
|---|---|
| 2 | CONCEPT RULE:(SENT, (ORD, (OR, "if", "when", "whenever"), "PastTime", " c{PastTime}")) |
| 3 | CONCEPT RULE:(SENT, (ORD, "c{PastTime}", (OR, "if", "when", "whenever"), "PastTime")) |

| 1 | CONCEPT:will |
|---|---|
| 2 | CONCEPT:be@ going to |
| 3 | CONCEPT:gonna |
| 4 | CONCEPT:be@ about to |
| 5 | CONCEPT:intend@ to |
| 6 | CONCEPT:aim@ to |
| 7 | CONCEPT:plan@ to |

FIG. 15Q

SYSTEMS, METHODS, AND GRAPHICAL USER INTERFACES FOR PREDICTING AND ANALYZING ACTION LIKELIHOOD

CROSS-REFERENCE TO RELATED APPLICATIONS

This application claims the benefit of U.S. Provisional Application No. 63/599,077, filed on 15 Nov. 2023, which is incorporated in its entirety by this reference.

TECHNICAL FIELD

This invention relates generally to the natural language processing field and, more specifically, to new and useful systems and methods for predicting and analyzing action likelihood in the natural language processing field.

BACKGROUND

The advent of massive online communication platforms and digital interaction spaces has significantly increased the volume and variety of communication and conversational data being generated daily. This data often contains valuable insights into user intentions, planned actions, and potential past, present, and/or future events, which can be critical in domains such as child safety, law enforcement, and customer relationship management. The ability to automatically analyze and prioritize these actions based on their linguistic and/or textual descriptions in documents has become a crucial need.

Traditionally, methods for analyzing text to evaluate the intent of certain actors and likelihood of event occurrences involve basic keyword searches or manual review processes, which often fall short in accurately determining the context and the nuanced implications of language. Additionally, these traditional methods may not adequately address the complexities of natural language processing and may result in high rates of false positives and negatives. Furthermore, the manual processes involved in reviewing and analyzing large volumes of text data may be time-consuming and prone to human error.

Accordingly, there is a need for new and improved systems and methods that automatically analyze text data to predict the likelihood of actions described therein. The embodiments of the present application provide technical solutions that at least address the needs described above, as well as the deficiencies of the state of the art.

BRIEF SUMMARY OF THE INVENTION(S)

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In some embodiments, a computer-program product comprises a non-transitory machine-readable storage medium storing computer instructions that, when executed by one or more processors, perform operations comprising: obtaining a text document that includes text describing an action; extracting, via a text processing model, one or more action tokens from the text document; executing, via the text processing model, a plurality of linguistic pattern searches that search the text document for one or more likelihood tokens associated with the one or more action tokens; classifying, via the text processing model, the action to a likelihood category associated with a respective linguistic pattern search of the plurality of linguistic pattern searches that identified the one or more likelihood tokens; classifying, via a domain classification model, the text document to a respective domain; computing, via an activity prioritization model, a priority value of the action described in the text document based on an input of the likelihood category and the respective domain; and generating a priority summary artifact that visually prioritizes the text document over one or more other text documents when the priority value of the action satisfies a pre-defined maximum priority threshold value.

In some embodiments, the activity prioritization model computes the priority value of the action by: determining a severity value of the likelihood category, determining a severity value of the respective domain, and calculating the priority value of the action using a weighted sum calculation that applies a first weight value to the severity value of the respective domain and a second weight value to the severity value of the likelihood category.

In some embodiments, the text processing model groups the plurality of linguistic pattern searches into a plurality of likelihood categories, including a low likelihood category, an intermediate likelihood category, and a high likelihood category, and classifying the action to the likelihood category includes: determining if the respective linguistic pattern search that identified the one or more likelihood tokens is grouped into the low likelihood category, the intermediate likelihood category, or the high likelihood category, classifying the action to the low likelihood category when the respective linguistic pattern search is determined to be grouped into the low likelihood category, classifying the action to the intermediate likelihood category when the respective linguistic pattern search is determined to be grouped into the intermediate likelihood category, and classifying the action to the high likelihood category if the respective linguistic pattern search is determined to be grouped into the high likelihood category.

In some embodiments, searching the text document for the one or more likelihood tokens includes searching the text document for one or more low likelihood tokens, and searching the text document for the one or more low likelihood tokens at least includes: searching the text document for one or more tokens associated with a counterfactual conditional; searching the text document for one or more tokens associated with a subjunctive expression; or searching the text document for one or more tokens associated with a present-time hypothetical condition.

In some embodiments, searching the text document for the one or more likelihood tokens includes searching the text document for one or more intermediate likelihood tokens, and searching the text document for the one or more intermediate likelihood tokens at least includes: searching the text document for one or more tokens associated with a future-time hypothetical condition; searching the text document for one or more tokens associated with a future-time predictive conditional; searching the text document for one or more tokens associated with an anticipatory expression; or searching the text document for one or more tokens associated with a modal expression.

In some embodiments, searching the text document for the one or more likelihood tokens includes searching the text document for one or more high likelihood tokens, and searching the text document for the one or more high likelihood tokens at least includes: searching the text document for one or more tokens associated with an expression of intent; searching the text document for one or more tokens associated with a past-time expression; searching the text document for one or more tokens associated with a present-time expression; or searching the text document for one or more tokens associated with a future-time expression.

In some embodiments, the respective linguistic pattern search identifies the one or more likelihood tokens by: searching a sentence of the text document for one or more tokens that satisfy pre-defined token likelihood search criteria.

In some embodiments, the text processing model groups the plurality of linguistic pattern searches into a plurality of likelihood categories, computing the priority value of the action at least includes converting the likelihood category to a severity value, and the activity prioritization model converts the likelihood category to the severity value by: searching for a record corresponding to the likelihood category in a lookup data structure that associates the plurality of likelihood categories with a respective severity value, and converting the likelihood category to the respective severity value defined in the record that corresponds to the likelihood category.

In some embodiments, the domain classification model is configured to classify the text document into a plurality of domains, computing the priority value of the action at least includes converting the respective domain to a severity value, and the activity prioritization model converts the respective domain to the severity value by: searching for a record corresponding to the respective domain in a lookup data structure that associates the plurality of domains with a respective severity value, and converting the respective domain to the respective severity value defined in the record that corresponds to the respective domain.

In some embodiments, extracting the one or more action tokens from the text document includes identifying a modal verb from a respective sentence within the text document, the plurality of linguistic pattern searches includes a temporal-based hypothetical conditional pattern search, and searching the text document for the one or more likelihood tokens includes searching for one or more tokens within the respective sentence of the text document that satisfies token likelihood search criteria of the temporal-based hypothetical conditional pattern search, wherein the token likelihood search criteria is satisfied when: a token within the respective sentence of the text document matches to a pre-defined set of conditional words, and the token that matched to the pre-defined set of conditional words is detected in a pre-defined position relative to the modal verb.

In some embodiments, the priority summary artifact forgoes visually prioritizing the text document over the one or more other text documents when the priority value of the action does not satisfy the pre-defined maximum priority threshold value.

In some embodiments, the text document is a chat conversation, the action described in the text document relates to a discussion of a physical meeting, the likelihood category associated with the action is one of: a low likelihood category, an intermediate likelihood category, or a high likelihood category, the respective domain of the text document corresponds to a child safety domain, and the priority value of the action represents a severity of the physical meeting.

In some embodiments, detecting the one or more action tokens includes detecting one or more verbs in the text document, and the text processing model uses part-of-speech tagging to detect the one or more verbs in the text document.

In some embodiments, the domain classification model is a child safety domain classification model, and classifying the text document to the respective domain includes classifying the text document to one of a plurality of child safety categories associated with the child safety domain classification model.

In some embodiments, the priority value of the action described in the text document satisfies the pre-defined maximum priority threshold value, and visually prioritizing the text document over the one or more other text documents includes: displaying an entry corresponding to the text document at a higher prominence than a text document that does not satisfy the pre-defined maximum priority threshold value.

In some embodiments, the one or more likelihood tokens includes a first set of likelihood tokens that were identified by the respective linguistic pattern search and a second set of likelihood tokens that were identified by a second respective linguistic pattern search of the plurality of linguistic pattern searches, the likelihood category of the respective linguistic pattern search is different from a likelihood category associated with the second respective linguistic pattern search, and classifying the action includes: receiving disambiguation user input that indicates whether the action described in the text document corresponds to the likelihood category associated with the respective linguistic pattern search or the likelihood category associated with the second respective linguistic pattern search, and in response to detecting the user input: in accordance with a determination that the disambiguation user input included a selection of the likelihood category associated with the respective linguistic pattern, classifying the action to the likelihood category associated with the respective linguistic pattern search, and in accordance with a determination that the disambiguation user input included a selection of the likelihood category associated with the second respective linguistic pattern, classifying the action to the likelihood category associated with the second respective linguistic pattern search.

In some embodiments, the one or more likelihood tokens includes a first set of likelihood tokens that were identified by the respective linguistic pattern search and a second set of likelihood tokens that were identified by a second respective linguistic pattern search of the plurality of linguistic pattern searches, the likelihood category of the respective linguistic pattern search is different from a likelihood category associated with the second respective linguistic pattern search, and classifying the action includes: determining if the likelihood category of the respective linguistic pattern search indicates a higher likelihood than the likelihood category associated with the second respective linguistic pattern search, classifying the action to the likelihood category associated with the respective linguistic pattern search if the likelihood category of the respective linguistic pattern search is determined to have the higher likelihood, and classifying the action to the likelihood category associated with the second respective linguistic pattern search if the likelihood category of the respective linguistic pattern search is determined to not have the higher likelihood.

In some embodiments, a computer-implemented method comprises: obtaining a text document that includes text describing an action; extracting, via a text processing model, one or more action tokens from the text document; executing, via the text processing model, a plurality of linguistic pattern searches that search the text document for one or more likelihood tokens associated with the one or more action tokens; classifying, via the text processing model, the action to a likelihood category associated with a respective linguistic pattern search of the plurality of linguistic pattern searches that identified the one or more likelihood tokens; classifying, via a domain classification model, the text document to a respective domain; computing, via an activity prioritization model, a priority value of the action described in the text document based on an input of the likelihood category and the respective domain; and generating a priority summary artifact that visually prioritizes the text document over one or more other text documents when the priority value of the action satisfies a pre-defined maximum priority threshold value.

In some embodiments, the activity prioritization model computes the priority value of the action by: determining a severity value of the likelihood category, determining a severity value of the respective domain, and calculating the priority value of the action using a weighted sum calculation that applies a first weight value to the severity value of the respective domain and a second weight value to the severity value of the likelihood category.

In some embodiments, the text processing model groups the plurality of linguistic pattern searches into a plurality of likelihood categories, including a low likelihood category, an intermediate likelihood category, and a high likelihood category, and classifying the action to the likelihood category includes: determining if the respective linguistic pattern search that identified the one or more likelihood tokens is grouped into the low likelihood category, the intermediate likelihood category, or the high likelihood category, classifying the action to the low likelihood category when the respective linguistic pattern search is determined to be grouped into the low likelihood category, classifying the action to the intermediate likelihood category when the respective linguistic pattern search is determined to be grouped into the intermediate likelihood category, and classifying the action to the high likelihood category if the respective linguistic pattern search is determined to be grouped into the high likelihood category.

In some embodiments, searching the text document for the one or more likelihood tokens includes searching the text document for one or more low likelihood tokens, and searching the text document for the one or more low likelihood tokens at least includes: searching the text document for one or more tokens associated with a counterfactual conditional; searching the text document for one or more tokens associated with a subjunctive expression; or searching the text document for one or more tokens associated with a present-time hypothetical condition.

In some embodiments, searching the text document for the one or more likelihood tokens includes searching the text document for one or more intermediate likelihood tokens, and searching the text document for the one or more intermediate likelihood tokens at least includes: searching the text document for one or more tokens associated with a future-time hypothetical condition; searching the text document for one or more tokens associated with a future-time predictive conditional; searching the text document for one or more tokens associated with an anticipatory expression; or searching the text document for one or more tokens associated with a modal expression.

In some embodiments, searching the text document for the one or more likelihood tokens includes searching the text document for one or more high likelihood tokens, and searching the text document for the one or more high likelihood tokens at least includes: searching the text document for one or more tokens associated with an expression of intent; searching the text document for one or more tokens associated with a past-time expression; searching the text document for one or more tokens associated with a present-time expression; or searching the text document for one or more tokens associated with a future-time expression.

In some embodiments, the respective linguistic pattern search identifies the one or more likelihood tokens by: searching a sentence of the text document for one or more tokens that satisfy pre-defined token likelihood search criteria.

In some embodiments, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: obtaining a text document that includes text describing an action; extracting, via a text processing model, one or more action tokens from the text document; executing, via the text processing model, a plurality of linguistic pattern searches that search the text document for one or more likelihood tokens associated with the one or more action tokens; classifying, via the text processing model, the action to a likelihood category associated with a respective linguistic pattern search of the plurality of linguistic pattern searches that identified the one or more likelihood tokens; classifying, via a domain classification model, the text document to a respective domain; computing, via an activity prioritization model, a priority value of the action described in the text document based on an input of the likelihood category and the respective domain; and generating a priority summary artifact that visually prioritizes the text document over one or more other text documents when the priority value of the action satisfies a pre-defined maximum priority threshold value.

In some embodiments, the text processing model groups the plurality of linguistic pattern searches into a plurality of likelihood categories, computing the priority value of the action at least includes converting the likelihood category to a severity value, and the activity prioritization model converts the likelihood category to the severity value by: searching for a record corresponding to the likelihood category in a lookup data structure that associates the plurality of likelihood categories with a respective severity value, and converting the likelihood category to the respective severity value defined in the record that corresponds to the likelihood category.

In some embodiments, the domain classification model is configured to classify the text document into a plurality of domains, computing the priority value of the action at least includes converting the respective domain to a severity value, and the activity prioritization model converts the respective domain to the severity value by: searching for a record corresponding to the respective domain in a lookup data structure that associates the plurality of domains with a respective severity value, and converting the respective domain to the respective severity value defined in the record that corresponds to the respective domain.

In some embodiments, extracting the one or more action tokens from the text document includes identifying a modal verb from a respective sentence within the text document, the plurality of linguistic pattern searches includes a temporal-based hypothetical conditional pattern search, and searching the text document for the one or more likelihood tokens includes searching for one or more tokens within the respective sentence of the text document that satisfies token likelihood search criteria of the temporal-based hypothetical conditional pattern search, wherein the token likelihood search criteria is satisfied when: a token within the respective sentence of the text document matches to a pre-defined set of conditional words, and the token that matched to the pre-defined set of conditional words is detected in a pre-defined position relative to the modal verb.

In some embodiments, the priority summary artifact forgoes visually prioritizing the text document over the one or more other text documents when the priority value of the action does not satisfy the pre-defined maximum priority threshold value.

In some embodiments, the text document is a chat conversation, the action described in the text document relates to a discussion of a physical meeting, the likelihood category associated with the action is one of: a low likelihood category, an intermediate likelihood category, or a high likelihood category, the respective domain of the text document corresponds to a child safety domain, and the priority value of the action represents a severity of the physical meeting.

BRIEF DESCRIPTION OF THE FIGURES

FIG. 15F illustrates an example of action tokens classified to a low likelihood category, according to some embodiments of the present technology.

FIG. 15G illustrates an example of action tokens classified to an intermediate likelihood category, according to some embodiments of the present technology.

FIG. 15H illustrates an example of action tokens classified to a high likelihood category, according to some embodiments of the present technology.

FIG. 15K illustrates an example of severity values associated with respective likelihood categories, according to some embodiments of the present technology.

FIG. 15L illustrates an example of severity values associated with respective domains, according to some embodiments of the present technology.

FIG. 15M illustrates an example of concept rules associated with linguistic patterns, according to some embodiments of the present technology.

FIG. 15N illustrates an example of concepts associated with linguistic patterns, according to some embodiments of the present technology.

FIGS. 15O-15P illustrate an exemplary user interface for displaying one or more priority summary artifacts, according to some embodiments of the present technology.

FIG. 15Q illustrates an example of a user interface for displaying data related to one or more text documents, according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

Example Systems

Systems depicted in some of the figures may be provided in various configurations. In some embodiments, the systems may be configured as a distributed system where one or more components of the system are distributed across one or more networks in a cloud computing system.

Figure 1:
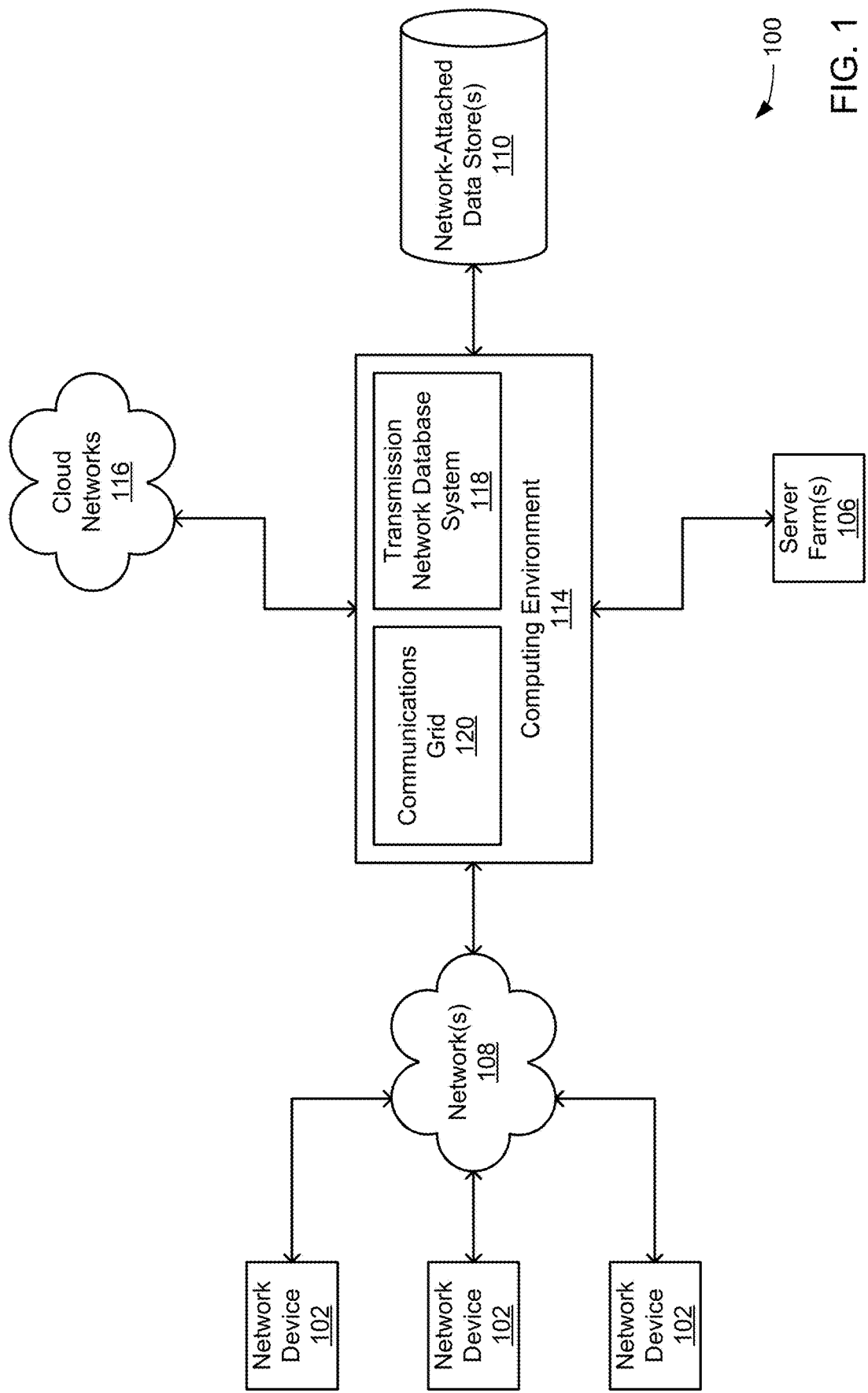
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
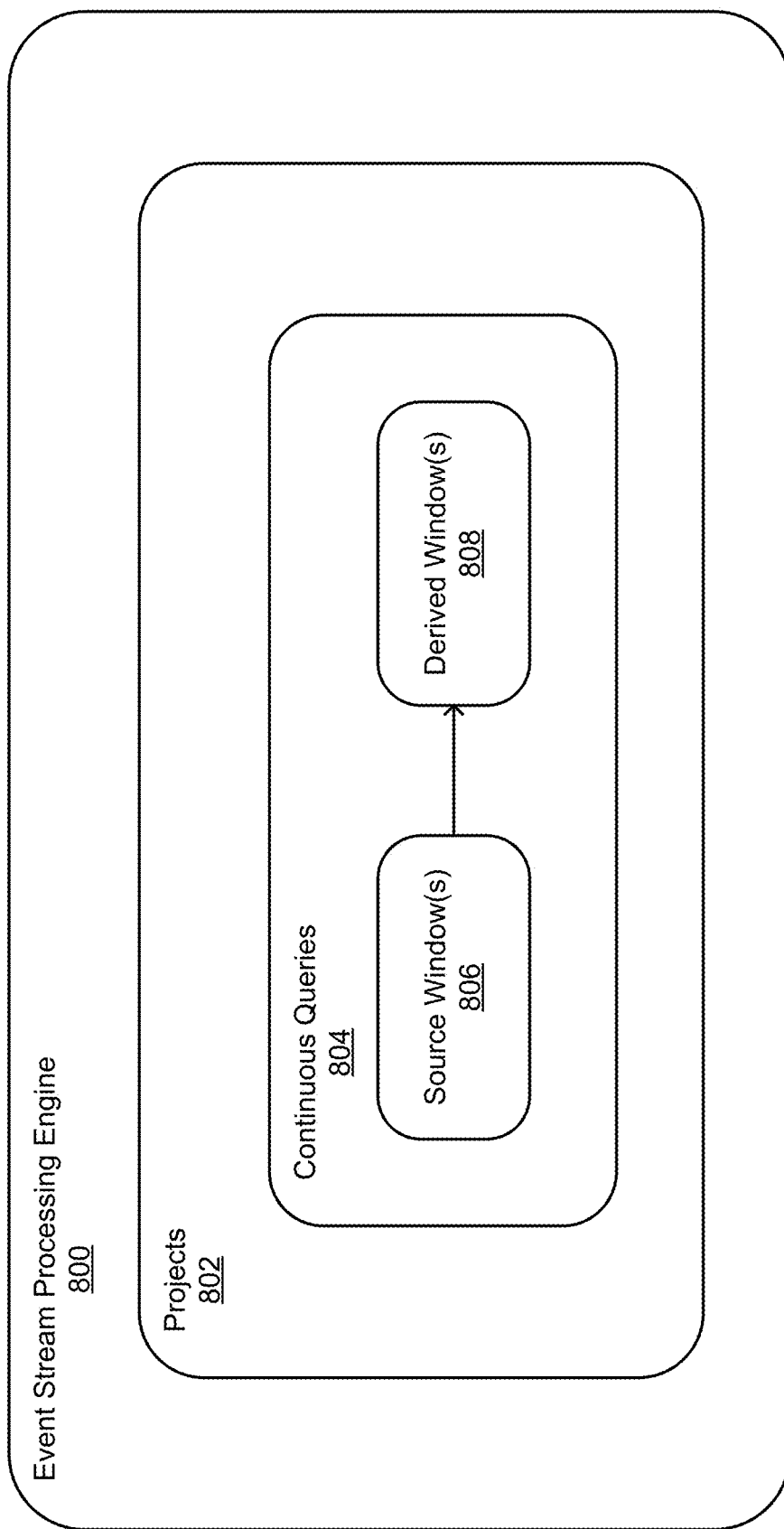
FIG. 8 illustrates a block diagram including components of an Event Stream Processing Engine (ESPE), according to some embodiments of the present technology.
Figure 9:
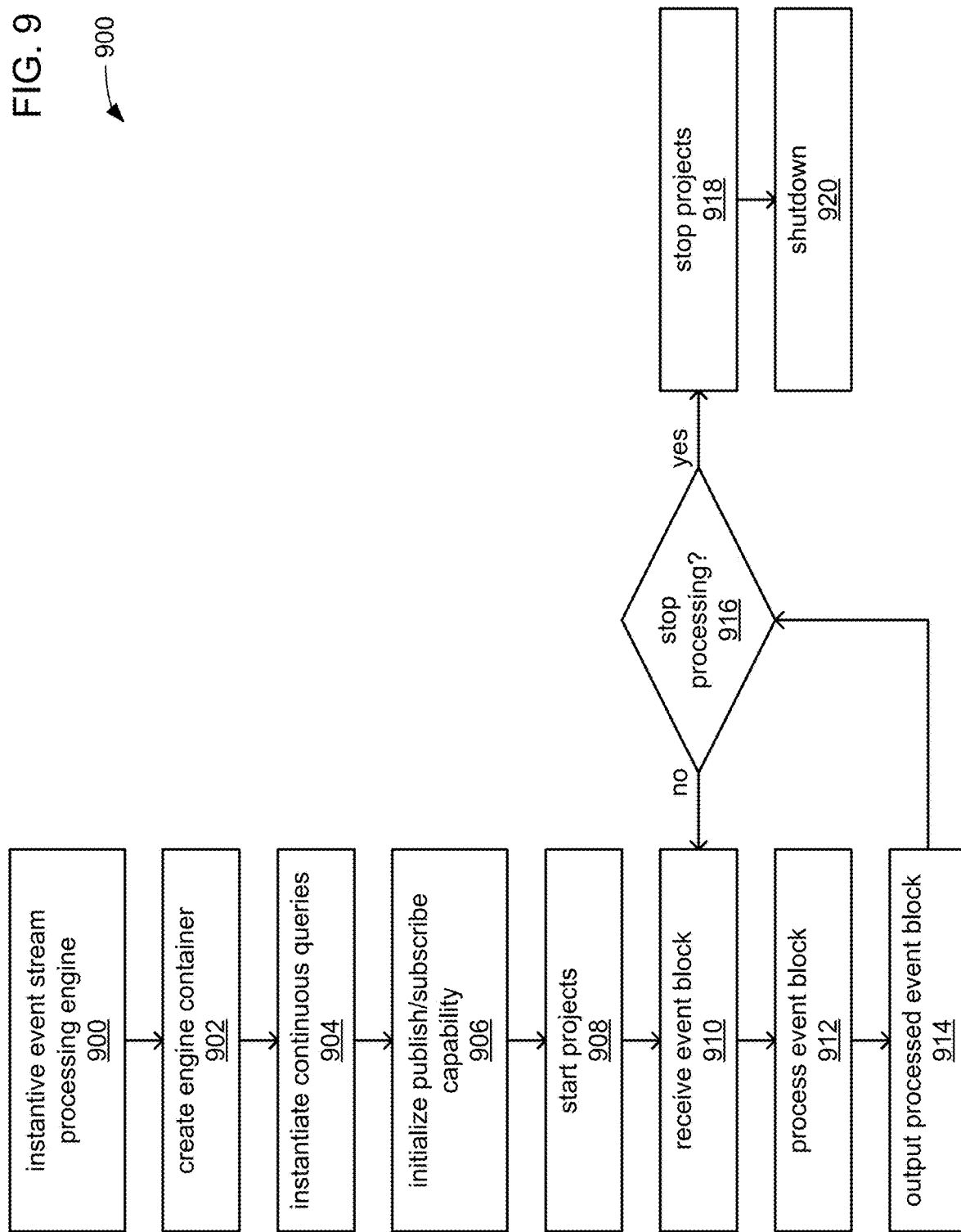
FIG. 9 illustrates a flow chart showing an example process including operations performed by an event stream processing engine, according to some embodiments of the present technology.
Figure 10:
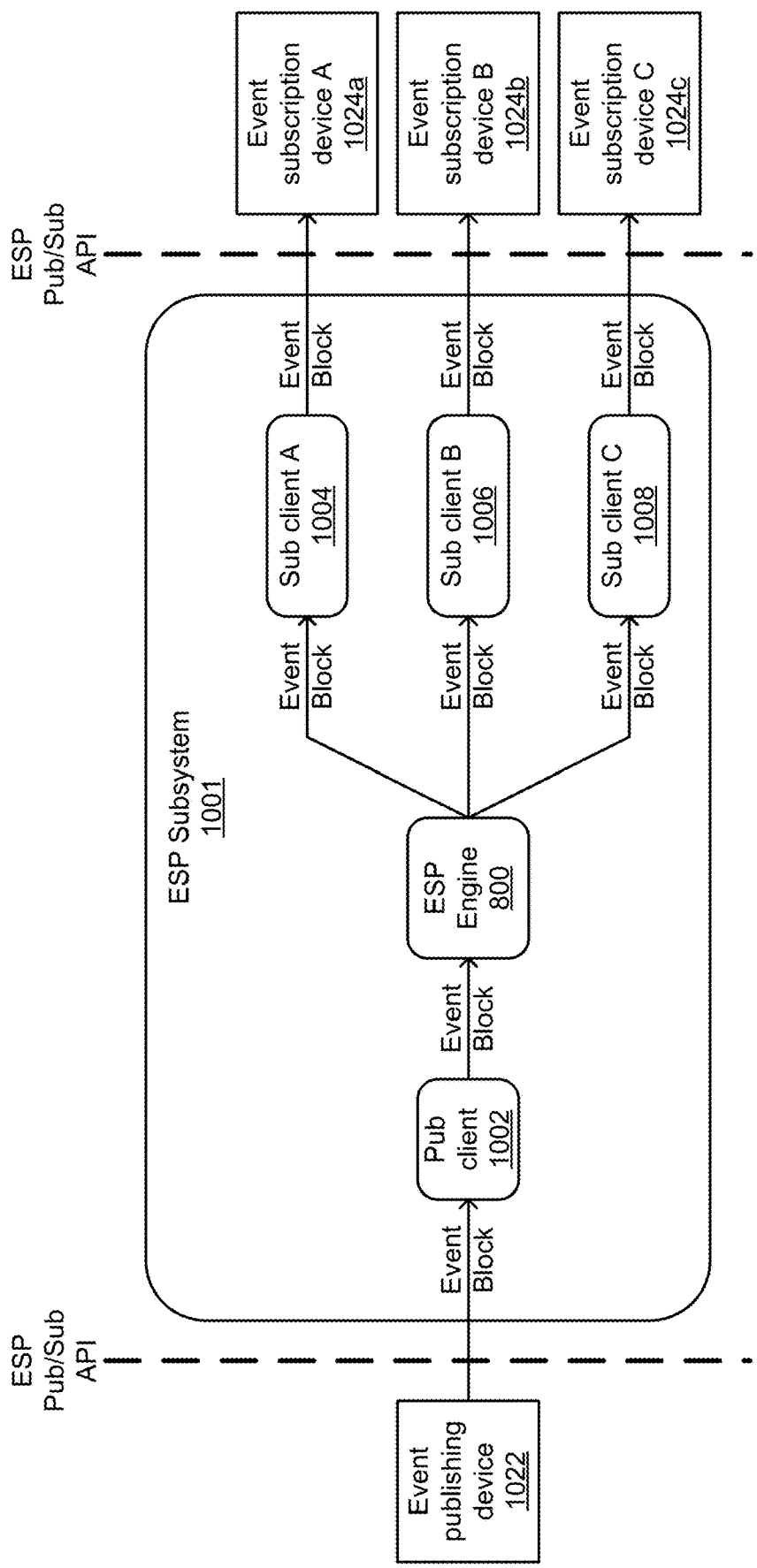
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms.

Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
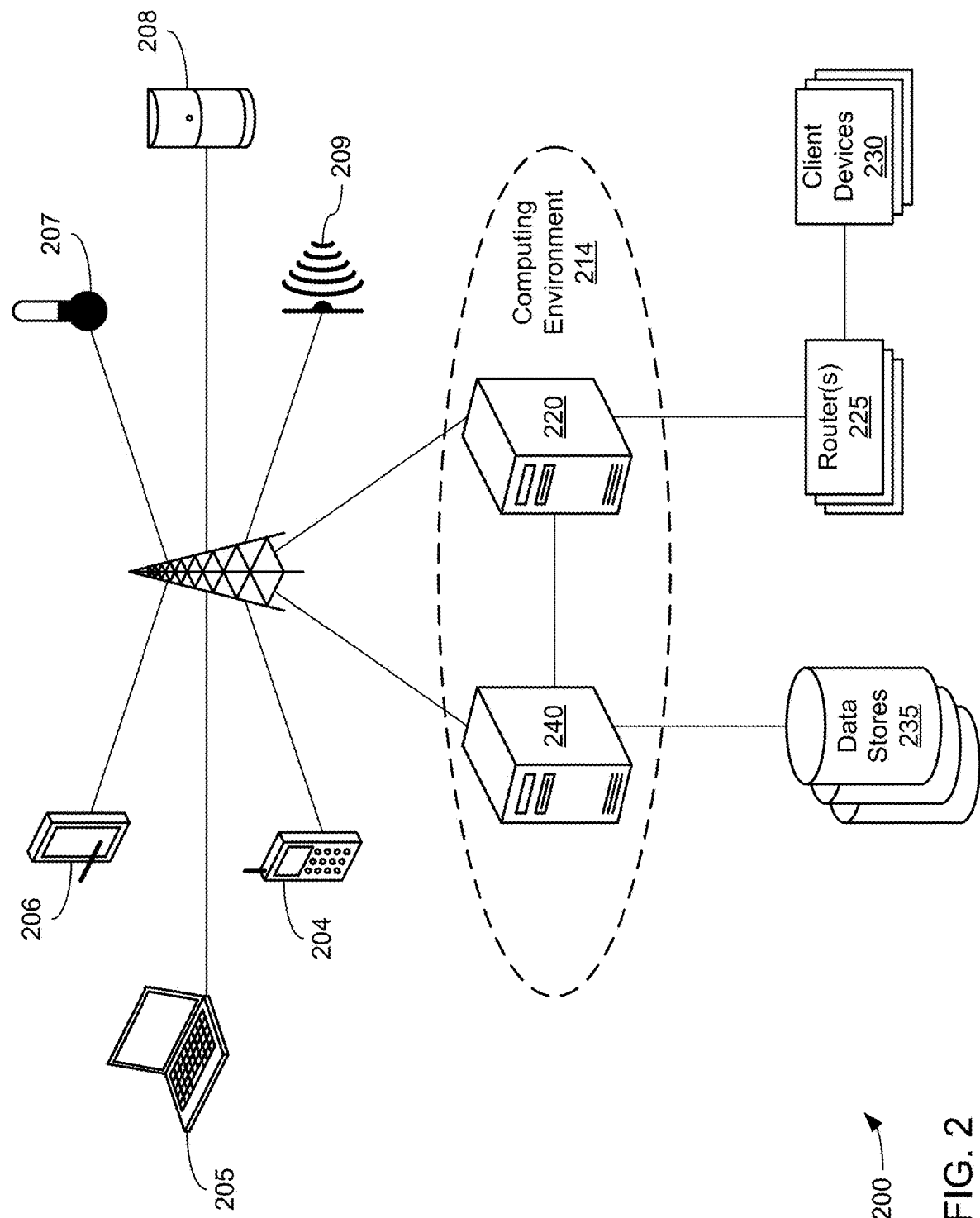
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
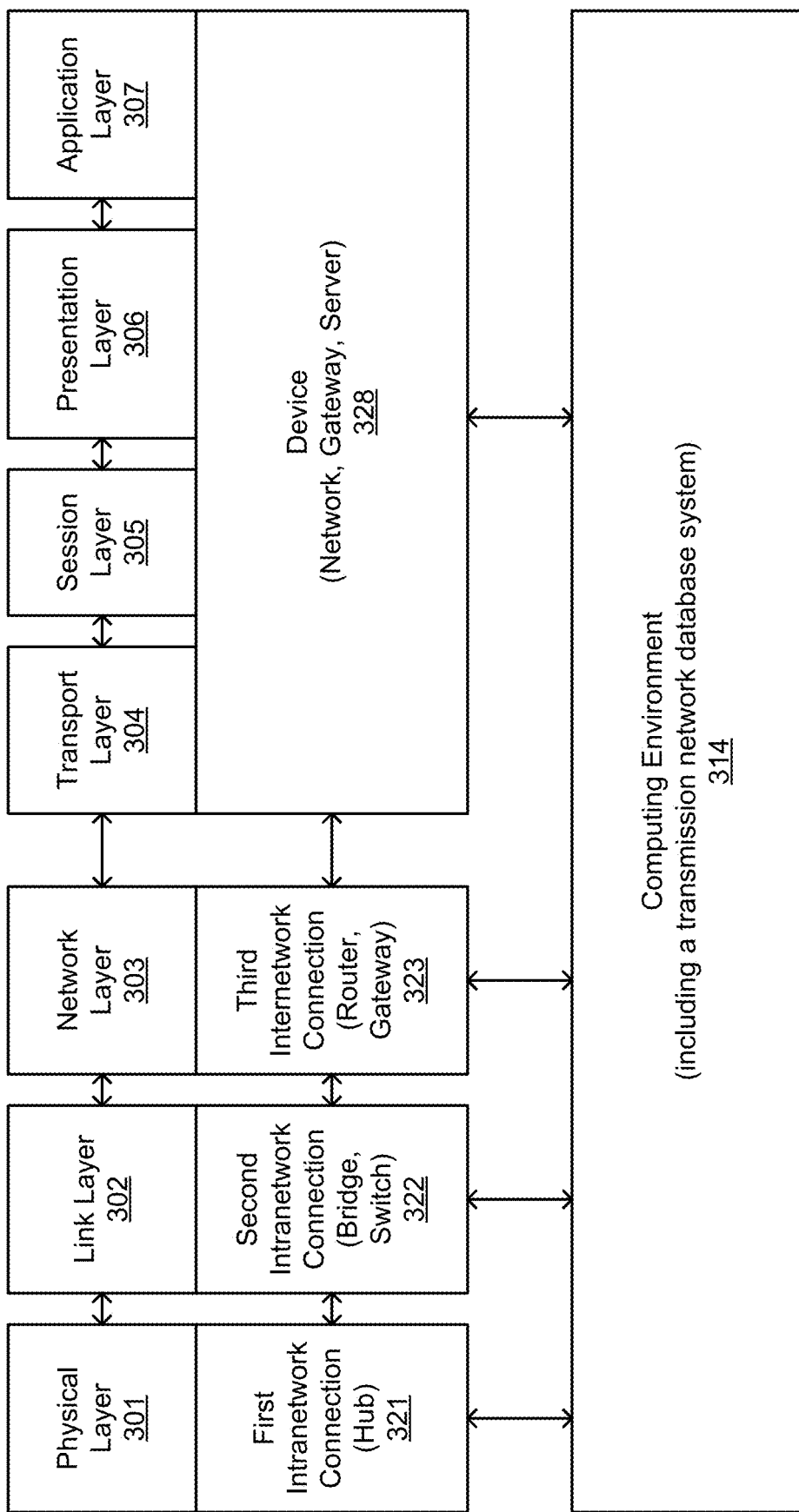
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is colocated by pre-distributing it to the grid nodes, and the analytic code on each node loads the local data into memory. Each node may be assigned a particular task such as a portion of a processing project, or to organize or control other nodes within the grid.

Figure 4:
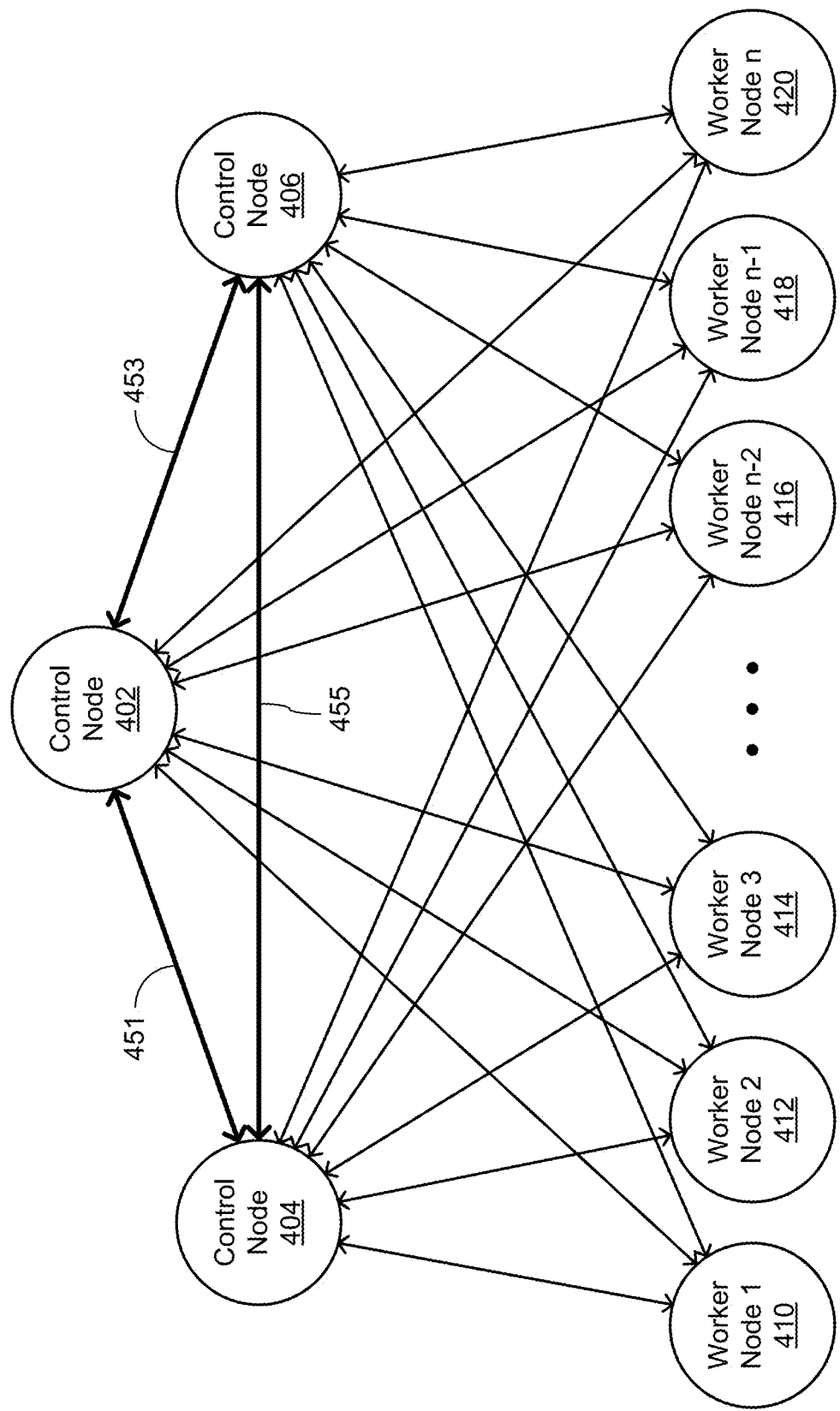
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
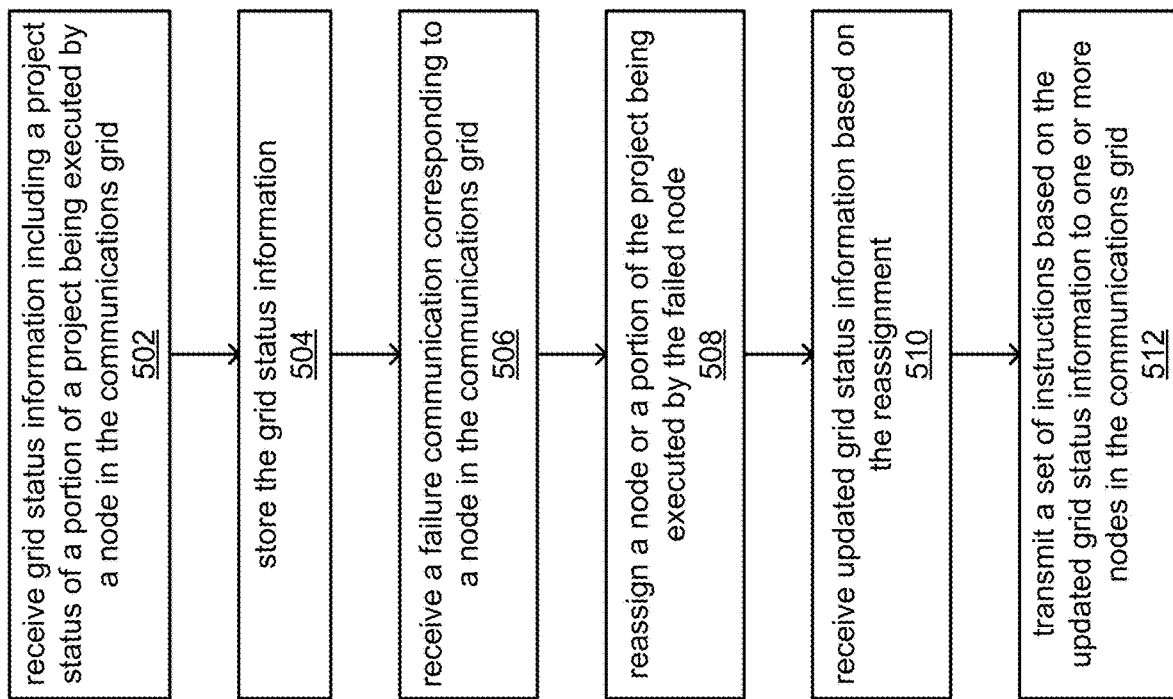
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
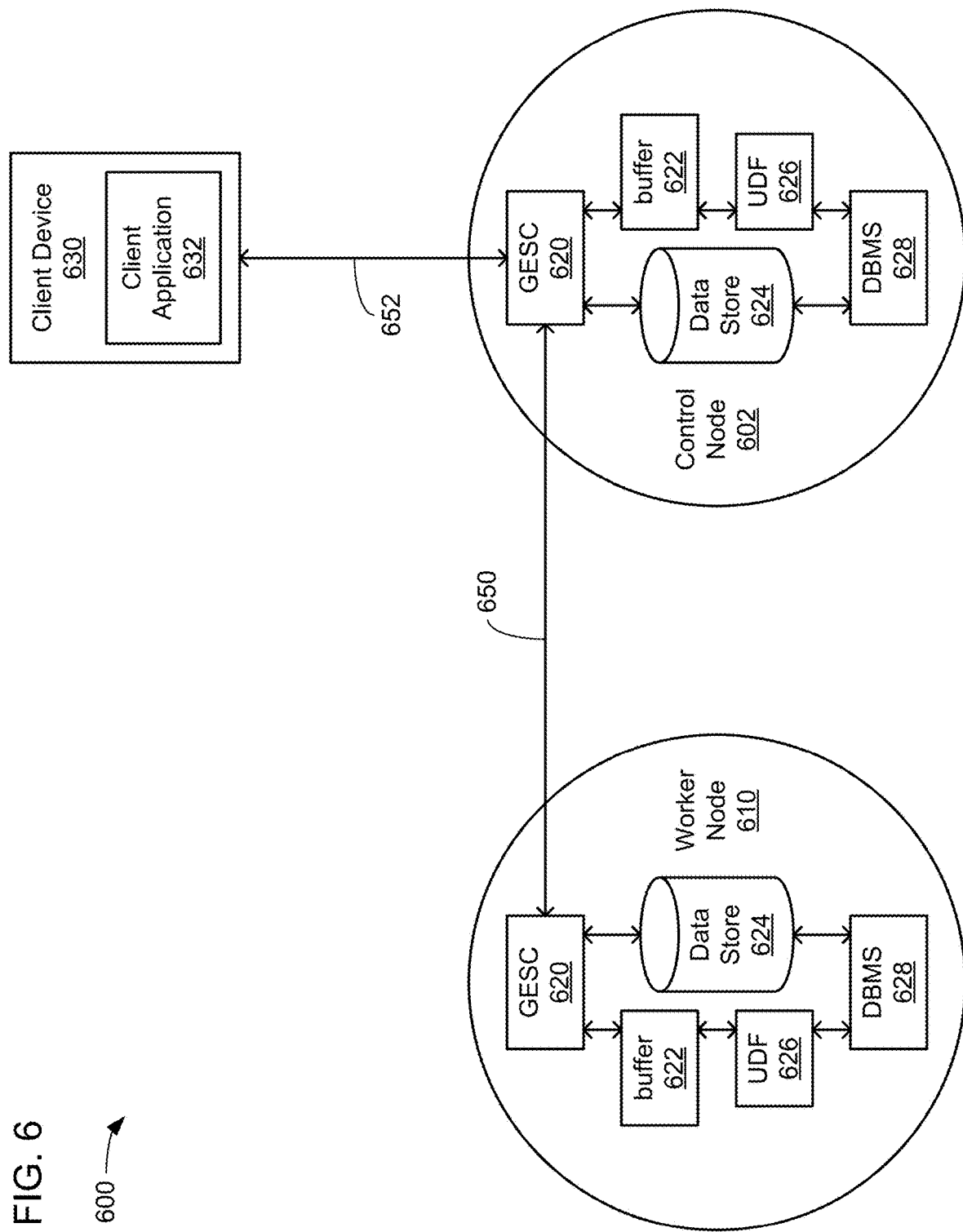
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 61o via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 1o8 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 61o. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
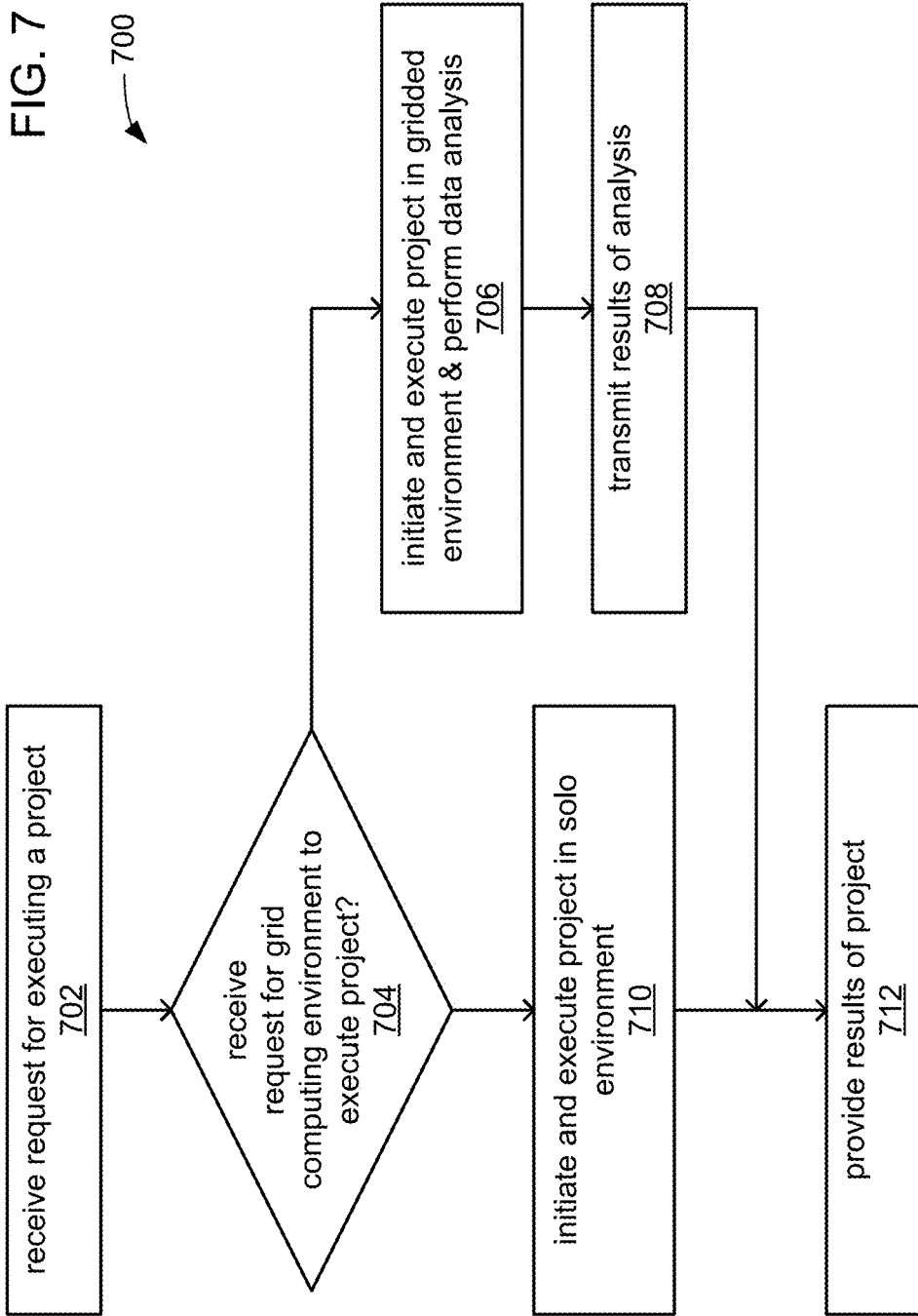
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device.

The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
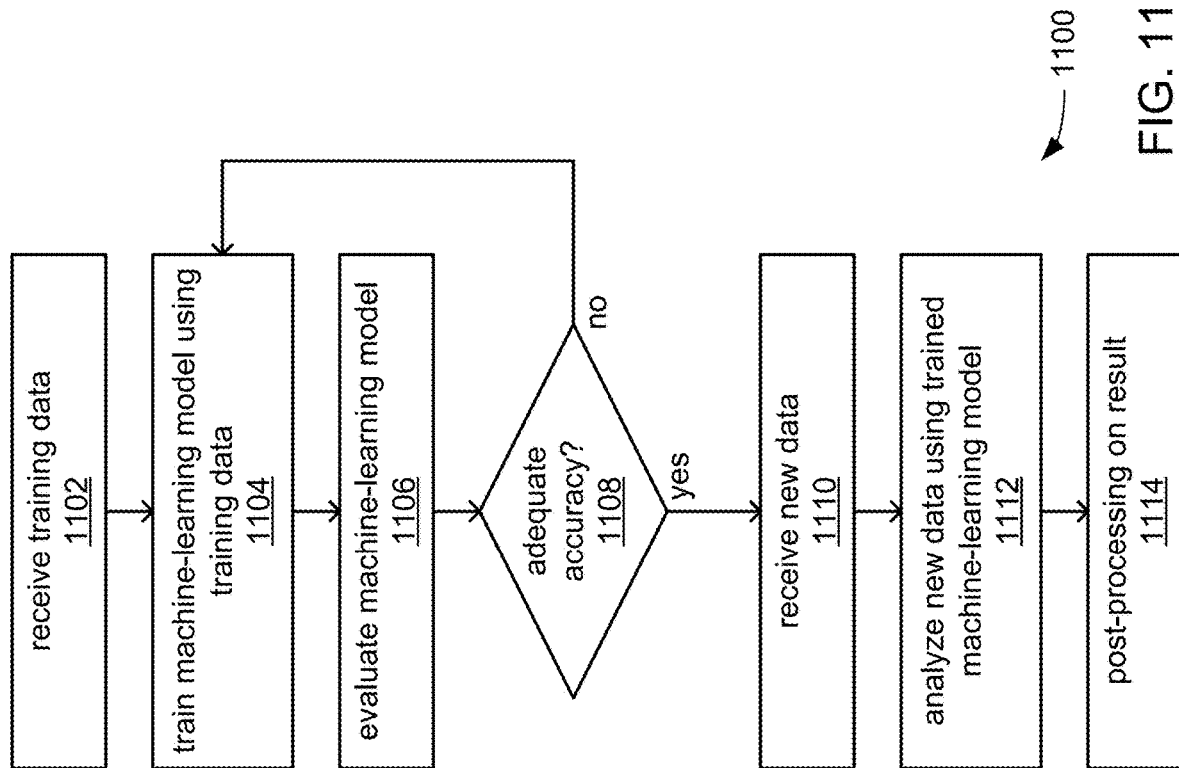
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
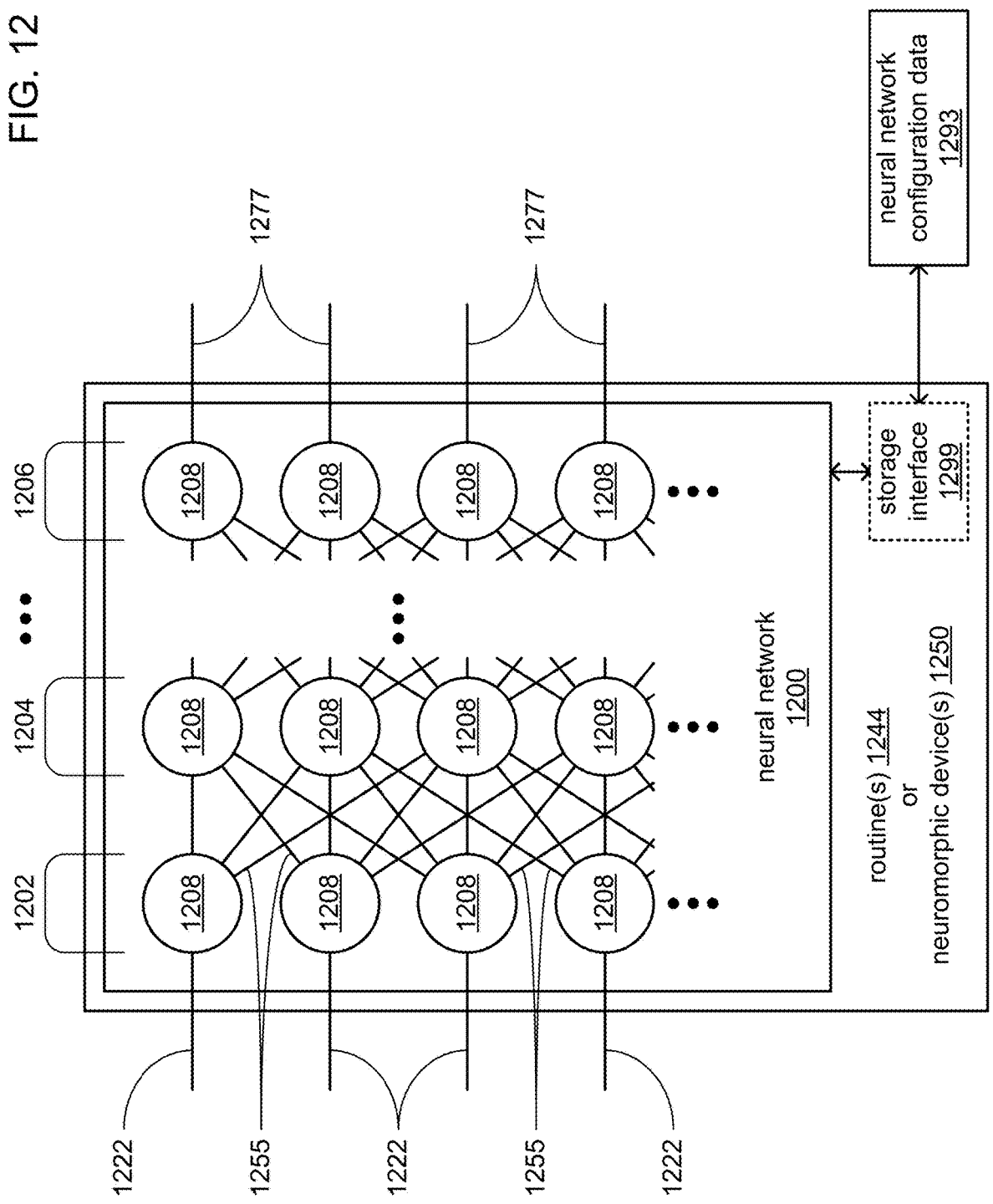
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
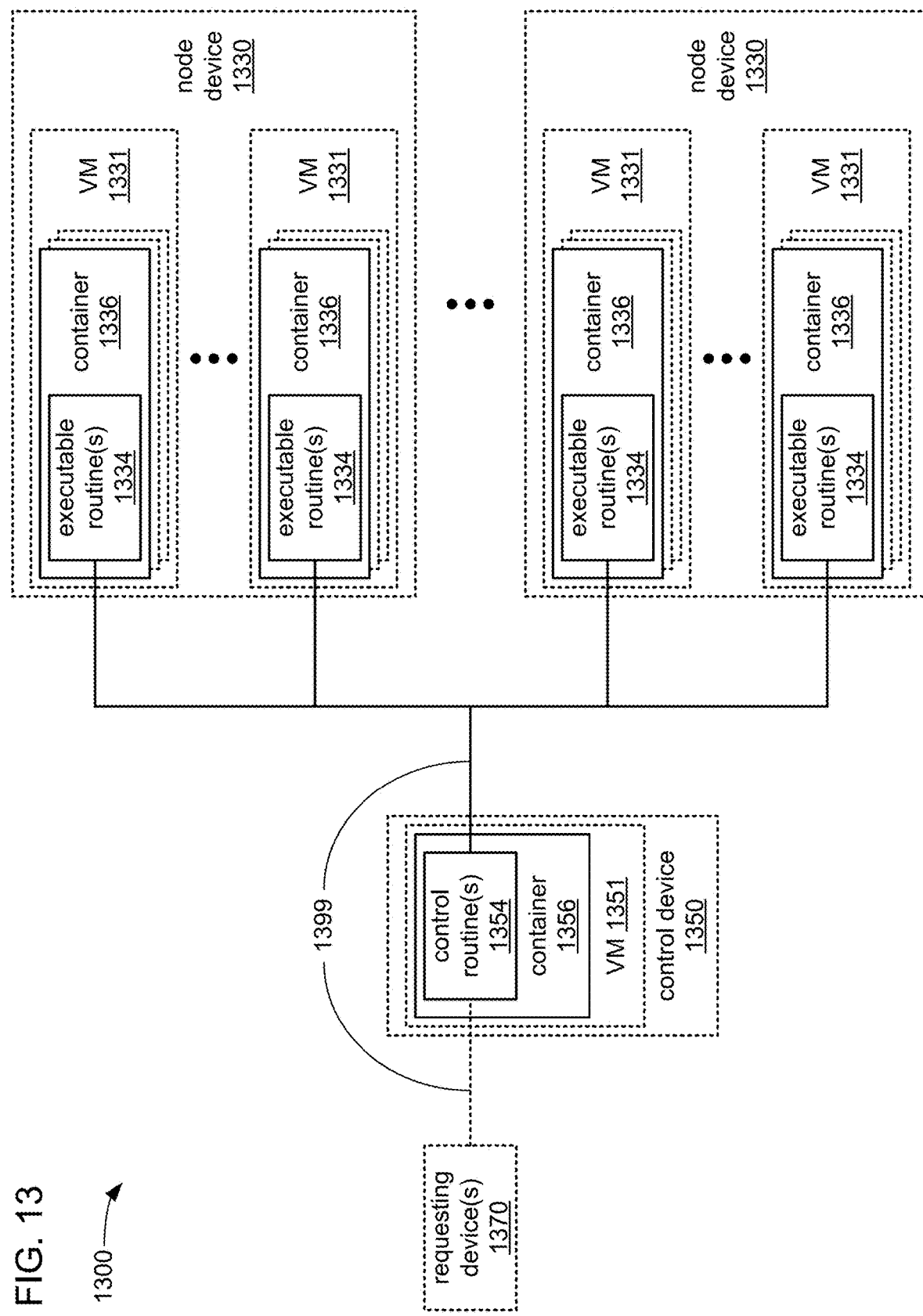
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

Figure 14:
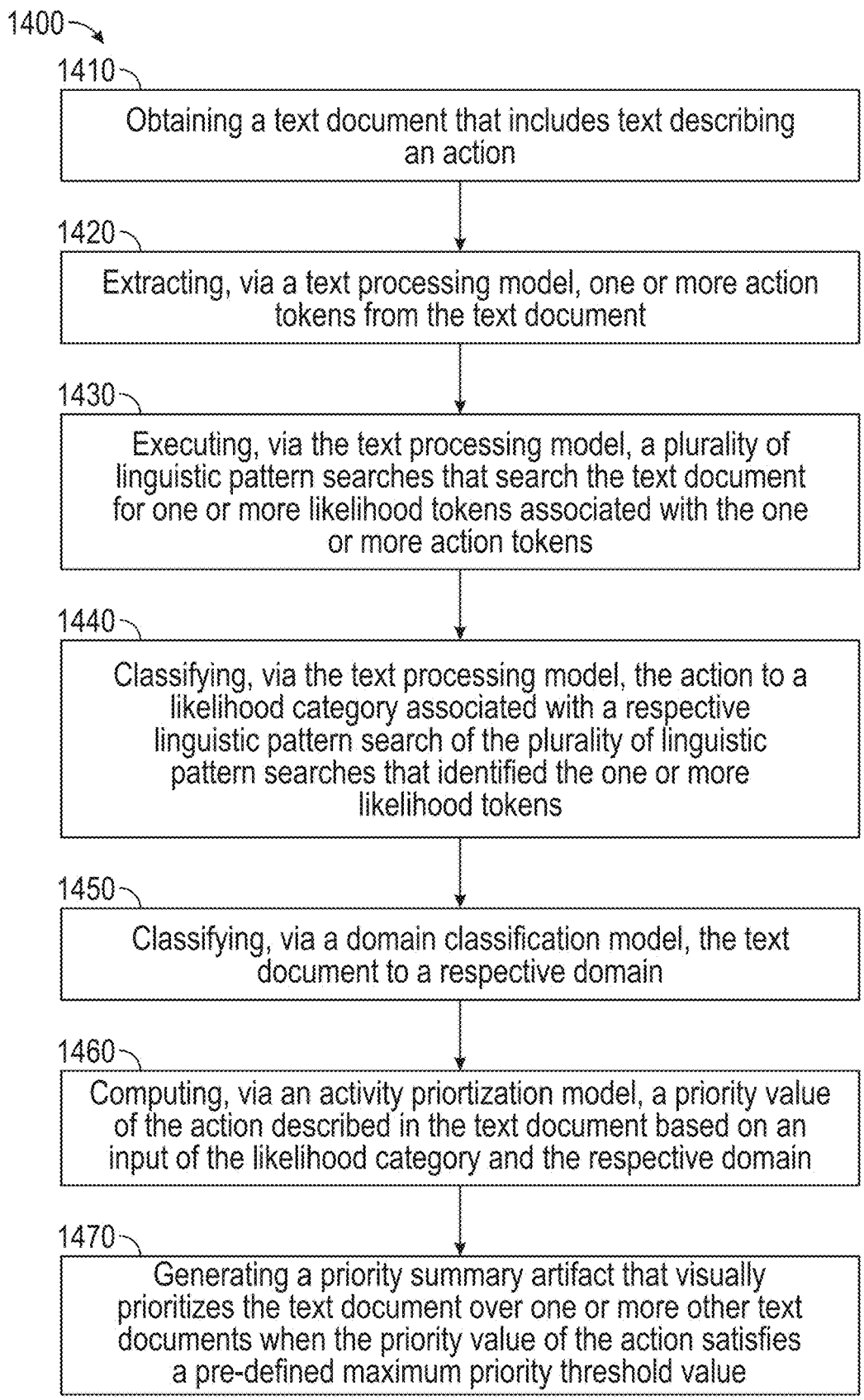
FIG. 14 illustrates an example of a method for predicting action likelihood based on linguistic patterns of a text processing model, according to some embodiments of the present technology.

FIG. 14 illustrates one embodiment of method 1400 for predicting the likelihood of actions based on linguistic patterns in a text document. It shall be appreciated that other embodiments contemplated within the scope of the present disclosure may involve more processes, fewer processes, different processes, or a different order of processes than illustrated in FIG. 14.

Method 1400, in some embodiments, may be used across a variety of industry and technological domains, such as child safety and protection, financial fraud detection, evidence collection and feedback in law enforcement contexts, corporate security, medical history and diagnosis in the healthcare fields, intelligence analysis, pharmaceutical research, customer relationship management, litigation risk management, market research, and/or any other domain in which determining the occurrence likelihood or probabilities of past, present, or future actions may be beneficial. Specifically, in the child safety domain, method 1400 may enhance investigations into past incidents and/or current or ongoing situations or relationships that may compromise child safety and support proactive measures to prevent potential future threats, thereby improving overall child safety protocols and investigative outcomes. In the financial fraud detection domain, method 1400 may enable identification and prioritization of actions or statements indicating potential fraud based on an automated analysis of text documents such as communication logs and transaction records while limiting the need for manual or human-driven analysis, thereby minimizing the risk of an exposure of personal information to human investigators.

Furthermore, in law enforcement contexts, method 1400 may enhance and streamline investigations by identifying and prioritizing high-risk situations and corresponding evidence based on analyzing text documents from various mediums including digital forensics examinations, social media, undercover online operations, and other law enforcement intelligence collection sources. Additionally, in healthcare fields, method 1400 may be used to automatically distinguish current diagnoses from historical ones in medical records, using linguistic analysis to prioritize patient medical concerns and differentiate them from past treatments and hypotheses, thus ensuring precise patient management as well as facilitating accurate medical service and procedure coding. It shall be noted that the above examples are not intended to be limiting and that method 1400 may be used in additional or different domains that require or benefit from discerning and prioritizing the likelihood and timing of actions.

In the field of intelligence analysis, method 1400 may enable detection and advance warning of potential threats such as terrorist attacks, as well helping to focus intelligence resources on genuine issues by identifying false positives. Additionally, in the context of pharmaceutical research, method 1400 may improve the accuracy of tracking and assessing adverse events in drug development by evaluating the likelihood of outcomes during clinical trials, ensuring better safety monitoring.

Furthermore, in the domain of customer relationship management, method 1400 may aid in customer retention by identifying the likelihood of customer complaints and/or indicators of potential customer cancellations or non-renewals in customer statements and discussions, enabling proactive measures to address customer concerns and improve retention rates before customer relationships deteriorate. In the field of litigation risk management, method 1400 may provide insights into the likelihood of legal actions or lawsuits against individuals or companies, aiding in the assessment of potential legal risks and litigation exposure. Additionally, in the context of market research, method 1400 may identify the likelihood of product purchases by analyzing the statements of customers, or potential customers, allowing companies to better anticipate demand levels and adjust inventory strategies.

Method 1400 results in many technical benefits over conventional intent detection techniques. Firstly, unlike conventional techniques comprising language systems relying on keywords or topics that struggle with nuances like sentiment and intention, method 1400 may function to utilize linguistic patterns to more accurately predict the likelihood of actions or events as perceived by an author (e.g., a writer, a speaker, etc.) of a statement. For instance, conventional linguistic intent detection systems may have difficulty determining, from the author's perspective, the likelihood of an action between anticipatory statements like "I plan to buy a car" versus "I wish I could buy a car." However, in some embodiments, method 1400 may leverage one or more semantic models and linguistic cues such as verb tense, grammatical mood, conditional statements, and negation to provide a more nuanced understanding of author intent across different timeframes, thereby enhancing the accuracy and depth of analysis compared to conventional methods.

Secondly, in some embodiments, method 1400 may integrate seamlessly with other natural language processing techniques, such as information extraction and categorization models, amplifying its utility in various applications. Method 1400, in some embodiments, may focus on author belief and intention rather than absolute truth or factuality, providing a greater insight into the subjective perspective of the author. Additionally, method 1400 may exhibit or provide benefits in several diverse domains, as previously described. It shall be noted that the above-described technical benefits are only a subset of the advantages of method 1400 and that a person of ordinary skill in the art will appreciate further advantages of method 1400 throughout the disclosure.

As shown in FIG. 14, method 1400 may include process 1410. Process 1410 may obtain a text document that includes text describing an action. The term "text document," as generally used herein, may refer to a textual data object comprising text that may include description(s) of, or reference(s) to, one or more actions. Furthermore, the term "action," as generally used herein, may refer to an event or activity, and may in various instances refer to an event or activity that may not occur at all, might possibly occur, might possibly have occurred, may have occurred, may currently be occurring, or may occur in the future. Various non-limiting examples of process 1410 obtaining a text document that includes text describing an action will now be described with reference to FIG. 15A.

Figure 15A:
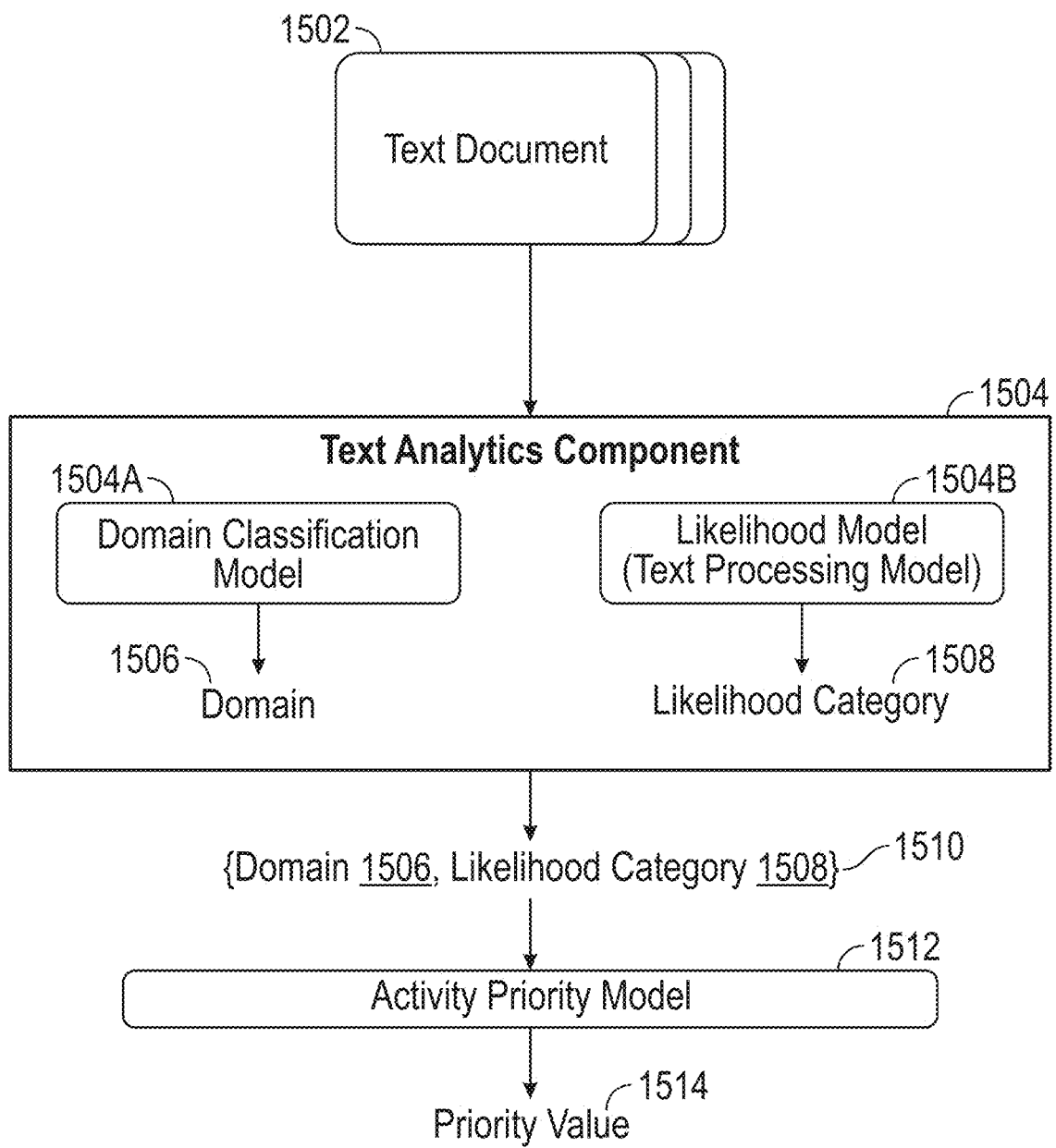
FIG. 15A illustrates an example of computing a priority value of an action described in a text document, according to some embodiments of the present technology.

As illustrated in FIG. 15A, process 1410 receives or obtains a text document 1502 that includes text data. In some embodiments, text document 1502 may include one or more interactions and/or statements relating to an action or activity. Text document 1502, in some non-limiting examples, may include a chat message, a chat conversation, a chat thread, an email or email chain, social media posts, and/or any other form of text data that may include text. Additionally, or alternatively, in some non-limiting examples, text document 1502 may be a transcript of verbal or audio speech. In some embodiments, text document 1502 may comprise one or more statements from an author of text document 1502. The term "author," as generally used herein, may refer to any source of textual information in text document 1502, and/or any source of verbal information that has been converted to text in text document 1502. Text document 1502 may be received by process 1410 in any suitable text data format including, but not limited to, plain text file (.txt), rich text format (.rtf), JSON (.json) format, XML (.xml) format, Microsoft Word Document format (.doc, .docx), PDF format (.pdf), HTML (.html), and/or the like.

In some embodiments, as illustrated in FIG. 15A, method 1400 may route text document 1502 to text analytics component 1504. Text analytics component 1504 may function to parse text document 1502, as further detailed herein. Additionally, text analytics component 1504 may function to analyze and process text data from text document 1502, as further detailed herein.

Referring to FIG. 14, in some embodiments, method 1400 may include process 1420. Process 1420 may extract, via a text processing model, one or more action tokens from the text document. The term "action token," as generally used herein, may refer to a token extracted from text document 1502 that may represent an action performed or described by an author of text document 1502. Various non-limiting examples of process 1420 using a text processing model to extract one or more action tokens 1518 from text document 1502 will now be described with reference to FIGS. 15A-15H.

As previously described and shown in FIG. 15A, method 1400 may function to route text document 1502 to text analytics component 1504. In some embodiments, text analytics component 1504 may use the same or similar techniques depicted in at least FIGS. 15A-15N to parse, analyze, and process text data from text document 1502. As shown in FIG. 15A, text analytics component 1504 may include domain classification model 1504A and likelihood model 1504B (sometimes referred to as "text processing model" 1504B).

Figure 15B:
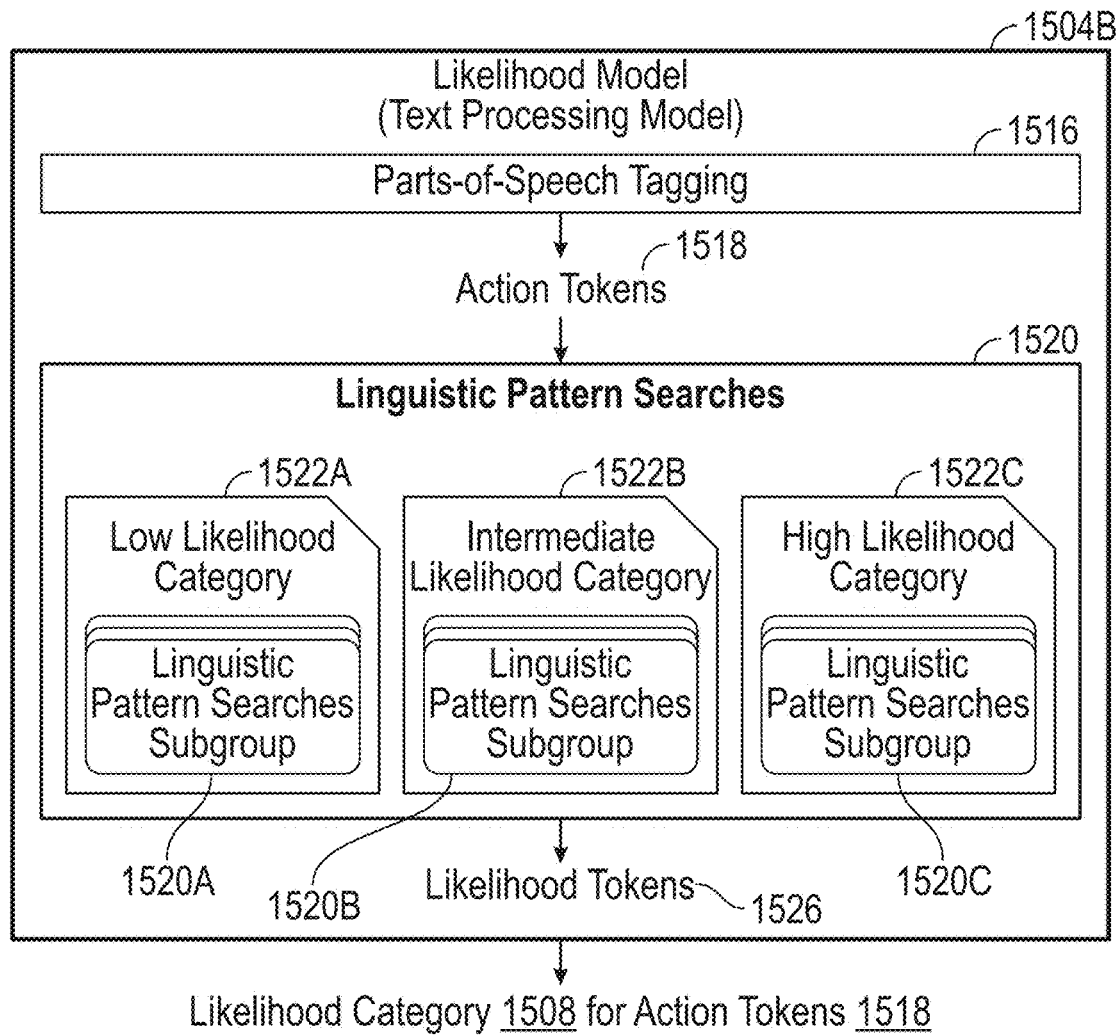
FIG. 15B illustrates an example of classifying an action to a likelihood category, according to some embodiments of the present technology.

In some embodiments, likelihood model 1504B may function to parse tokens from text document 1502. As generally used herein, the term "token" may refer to a discrete unit of text that may include a word, a number, a symbol, punctuation, a phrase, or any other suitable element of text. As shown in FIG. 15B, likelihood model 1504B may include part-of-speech tagging 1516 that may function to identify and assign a part-of-speech label (e.g., "noun," "verb," "adjective," or the like) to each token of text document 1502.

As shown in FIG. 15A, part-of-speech tagging 1516 may output one or more action tokens 1518 extracted from text document 1502. In some embodiments, part-of-speech tagging 1516 may identify one or more predicates or verbs in text document 1502, and in turn, part-of-speech tagging 1516 may function to output the one or more predicates or verbs as one or more action tokens 1518. For instance, in the example shown in FIG. 15F, sentence 1524A of text document 1502 may include the text, "I dreamt that we met." In this example, part-of-speech tagging 1516 may identify the word "met" as a verb that may be output as action token 1518A. In some embodiments, each action token 1518 may include one or more verbs or verb phrases, and/or any words, phrases, or other text data representing an action described in the text of text document 1502.

In some embodiments, part-of-speech tagging 1516 may identify one or more modal verbs in text document 1502, and in turn, part-of-speech tagging 1516 may function to include one or more modal verbs in the extracted action tokens 1518. For instance, in the example shown in FIG. 15F, sentence 1524C of text document 1502 may include the text, "I would love to give you some money but we have to be discreet." In this example, part-of-speech tagging 1516 may identify the word "would" as a modal verb associated with the verb "love." In this example, part-of-speech tagging 1516 may output the phrase "would love" as action token 1518C.

Additionally, in some embodiments, likelihood model 1504B may function to perform one or more parsing functions to parse text data from text document 1502 including, but not limited to, sentence breaking, tokenization, and lemmatization. The term "sentence breaking," as generally used herein, may refer to a text parsing process of dividing the text data of text document 1502 into individual sentences based on identifying sentence boundaries in the text data. The term "tokenization," as generally used herein, may refer to a text parsing process of splitting the text data of text document 1502 into discrete tokens. The term "lemmatization," as generally used herein, may refer to a text parsing process of transforming each word in text document 1502 into its base or root form.

Referring to FIG. 14, in some embodiments, method 1400 may include process 1430. Process 1430 may execute, via the text processing model, a plurality of linguistic pattern searches that search the text document for one or more likelihood tokens associated with the one or more action tokens. The term "linguistic pattern search," as generally used herein, may refer to a search executed to detect specific linguistic patterns in text document 1502 to identify one or more likelihood tokens 1526. The term "likelihood token," as generally used herein, may refer to a token in text document 1502 that indicates the likelihood of the occurrence of an action associated with the one or more action tokens 1518. In some embodiments, the term "likelihood" may refer to the probability that an action will occur, has occurred, or is currently occurring from the perspective of an author (e.g., a speaker or writer) of textual information in text document 1502. Various non-limiting examples of process 1430 executing a plurality of linguistic pattern searches 1520 will now be described with reference to FIGS. 15A-15N.

Process 1430, in some embodiments, may function to execute a plurality of linguistic pattern searches that may each be configured to find a distinct linguistic pattern in text document 1502. The term "linguistic pattern," as generally used herein, may refer to recurring structures or configurations of language elements that may convey specific meanings or intents in text document 1502, specifically with regards to the likelihood of actions discussed in text document 1502. In some examples, linguistic patterns may be identified by linguistic pattern searches 1520 based on the presence and relative positioning of words, phrases, and grammatical features in text document 1502 including, but not limited to, conditions and conditional statements, verb tenses, modal verbs, subjunctive mood, and temporal words and phrases. For example, one of linguistic pattern searches 1520 may function as a temporal-based (e.g., future-time or present-time) hypothetical conditional pattern search, which may be based on identifying conditional token(s) (e.g., conditional word(s)) positioned relative to modal verbs in a sentence of text document 1502.

In some embodiments, linguistic pattern searches 1520 may each be governed by one or more concepts or concept rules, whereby each concept or concept rule may define a search query to identify one or more likelihood tokens 1526 associated with a distinct linguistic pattern in text document 1502. As generally used herein, the term "concept" may refer to a linguistic pattern search query comprising a token match for identifying one or more likelihood tokens 1526 that may include optional modifiers, such as lemmatization modifiers. As generally used herein, the term "concept rule" may refer to a linguistic pattern search query that may include one or more token matches, one or more operators and operands, one or more modifiers, one or more keywords, and/or one or more references to other concepts or concept rules for identifying one or more likelihood tokens 1526. Each linguistic pattern search of the plurality of linguistic pattern searches 1520 may function to scan text document 1502 based on one or more associated concepts and/or concept rules to find occurrences of likelihood tokens 1526 that meet the search queries defined by the associated concepts and/or concept rules. Therefore, likelihood tokens 1526 may represent linguistic patterns found in linguistic pattern searches 1520 of text document 1502.

As illustrated in the non-limiting example of FIG. 15M, concept rules 1540 may function to search text document 1502 for linguistic patterns associated with past tense conditional statements, such as the statement, "When he sneezed, the dog jumped up quickly." As shown in FIG. 15M, concept rules 1540 may include the "SENT" keyword that may be used to restrict rule matches to a single sentence, logical expressions with operators like "AND" and "OR" that may specify relationships between token matches, and the "ORD" keyword that may ensure that the tokens or rules appear in the order specified in the concept rule. In the example of FIG. 15M, concept rules 1540 include a concept rule defined as (SENT, (ORD, (OR, "if", "when", "whenever"), "PastTime", "_c{PastTime}")). This concept rule may specify that, within a single sentence, one of tokens "if," "when," or "whenever" must appear before two tokens that satisfy the "PastTime" concept, where the "PastTime" concept may refer to one or more tokens that indicate a past or previous temporal state (e.g., a past tense verb). For example, this concept rule may be executed as a search query by a linguistic pattern search to find a past tense conditional statement such as "When he sneezed, the dog jumped up quickly," in text document 1502, since in this instance the token "When" appears before a first past tense token (e.g., "PastTime") "sneezed" and a second past tense token (e.g., "PastTime") "jumped." In such an example, the one or more tokens matching the concept rule may be identified as likelihood tokens 1526.

Additionally, as illustrated in the non-limiting example of FIG. 15M, concept rules 1540 may include a concept rule defined as (SENT, (ORD, "_c{PastTime}", (OR, "if", "when", "whenever"), "PastTime")). This concept rule may specify that, within a single sentence, a token that satisfies the "PastTime" concept must appear before one of the tokens "if," "when," or "whenever," followed by another token that satisfies the "PastTime" concept. For example, this concept rule may be executed as a search query by a linguistic pattern search to find a past tense conditional statement such as "The dog jumped up quickly when he sneezed" in text document 1502, since in this instance the past tense token "jumped" appears before the token "when," followed by another past tense token "sneezed." In such an example, the one or more tokens matching the concept rule may be identified as likelihood tokens 1526. It shall be noted that the above examples are non-limiting, and other suitable concept rules may be configured to identify likelihood tokens for one or more linguistic patterns.

In the non-limiting example of FIG. 15N, concepts 1542 may each comprise a token matching rule for identifying one or more likelihood tokens 1526. For example, concepts 1542 include a concept configured with the likelihood token "will," which may be satisfied upon finding the token "will" in text document 1502. In some embodiments, the @ keyword may be used when configuring concepts for lemmatization of tokens. For instance, as illustrated in FIG. 15N, concepts 1542 include a concept defined by the likelihood tokens "be@ going to" in which the token "be@" is lemmatized to include its various forms including "is," "are," and the like, such that the concept may be satisfied upon finding the phrases "be going to," "is going to," "are going to," and other analogous phrases in text document 1502. In this example, one of linguistic pattern searches 1520 may use concepts 1542 to identify instances of tokens in text document 1502 that match the token(s) of concepts 1542, and in turn the linguistic pattern search may return the identified instances of tokens as likelihood tokens 1526.

Figure 15C:
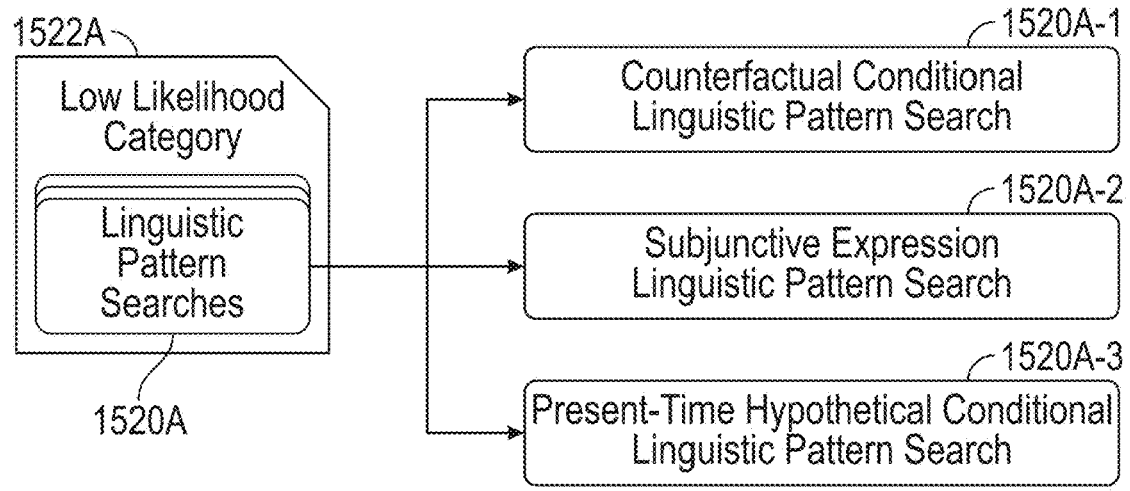
FIG. 15C illustrates an example of low likelihood category linguistic pattern searches, according to some embodiments of the present technology.

As illustrated in FIGS. 15B-15E, linguistic pattern searches 1520 may each be configured to search text document 1502 for a corresponding linguistic pattern. For instance, as shown in FIG. 15C, linguistic pattern searches 1520 may include linguistic pattern searches subgroup 1520A comprising counterfactual conditional linguistic pattern search 1520A-1 that may function to search text document 1502 for counterfactual conditional linguistic patterns, subjunctive expression linguistic pattern search 1520A-2 that may function to search text document 1502 for subjunctive expression linguistic patterns, and present-time hypothetical conditional linguistic pattern search 1520A-3 that may function to search text document 1502 for present-time hypothetical conditional linguistic patterns. In some embodiments, as illustrated in FIG. 15C, the linguistic patterns associated with linguistic pattern searches subgroup 1520A may indicate a low likelihood of actions associated with action token(s) 1518, and likelihood tokens identified by linguistic pattern searches 1520A-1, 1520A-2, 1520A-3 may be referred to as low likelihood tokens.

Figure 15D:
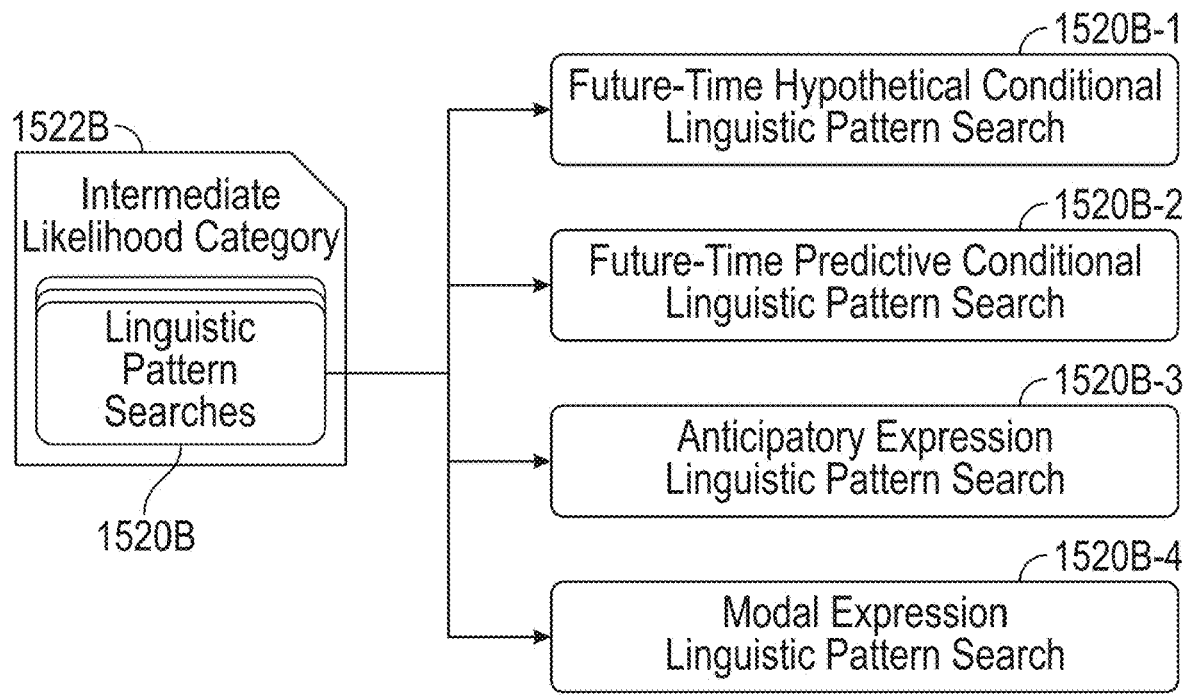
FIG. 15D illustrates an example of intermediate likelihood category linguistic pattern searches, according to some embodiments of the present technology.

Additionally, as shown in FIG. 15D, linguistic pattern searches 1520 may include linguistic pattern searches subgroup 1520B comprising future-time hypothetical conditional linguistic pattern search 1520B-1 that may function to search text document 1502 for future-time hypothetical conditional linguistic patterns, future-time predictive conditional linguistic pattern search 1520B-2 that may function to search text document 1502 for future-time predictive conditional linguistic patterns, anticipatory expression linguistic pattern search 1520B-3 that may function to search text document 1502 for anticipatory expression linguistic patterns, and modal expression linguistic pattern search 1520B-4 that may function to search text document 1502 for modal expression linguistic patterns. In some embodiments, as illustrated in FIG. 15D, the linguistic patterns associated with linguistic pattern searches subgroup 1520B may indicate an intermediate likelihood of actions associated with action token(s) 1518, and likelihood tokens identified by linguistic pattern searches 1520B-1, 1520B-2, 1520B-3, 1520B-4 may be referred to as intermediate likelihood tokens.

Figure 15E:
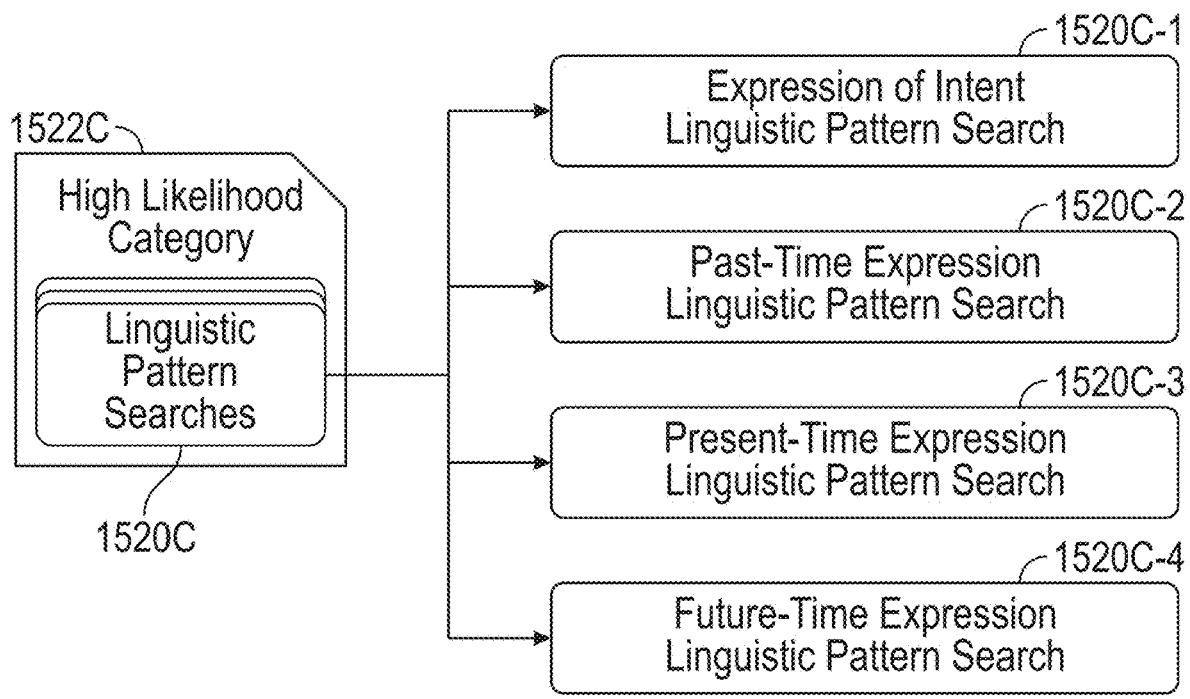
FIG. 15E illustrates an example of high likelihood category linguistic pattern searches, according to some embodiments of the present technology.

Additionally, as illustrated in FIG. 15E, linguistic pattern searches 1520 may include linguistic pattern searches subgroup 1520C comprising expression of intent linguistic pattern search 1520C-1 that may function to search text document 1502 for expression of intent linguistic patterns, past-time expression linguistic pattern search 1520C-2 that may function to search text document 1502 for past-time expression linguistic patterns, present-time expression linguistic pattern search 1520C-3 that may function to search text document 1502 for present-time expression linguistic patterns, and future-time expression linguistic pattern search 1520C-4 that may function to search text document 1502 for future-time expression linguistic patterns. In some embodiments, as illustrated in FIG. 15E, the linguistic patterns associated with linguistic pattern searches subgroup 1520C may indicate a high likelihood of actions associated with action token(s) 1518, and likelihood tokens identified by linguistic pattern searches 1520C-1, 1520C-2, 1520C-3, 1520C-4 may be referred to as high likelihood tokens.

In some embodiments, process 1430 may identify multiple sets of likelihood tokens 1526 from different linguistic pattern searches 1520, in which case process 1430 may function to group each set of likelihood tokens based on the respective linguistic pattern search that found them. Additionally, or alternatively, process 1430 may function to divide likelihood tokens 1526 into groups based on the respective linguistic pattern searches subgroup 1520A, 1520B, 1520C. For instance, likelihood tokens 1526 may include a set of low likelihood tokens, a set of intermediate likelihood tokens, and a set of high likelihood tokens.

Referring to FIG. 14, in some embodiments, method 1400 may include process 1440. Process 1440 may classify, via the text processing model, the action to a likelihood category associated with a respective linguistic pattern search of the plurality of linguistic pattern searches that identified the one or more likelihood tokens. The term "likelihood category," as generally used herein, may refer to a classification that indicates the likelihood of an action associated with action tokens 1518 occurring (e.g., predict the likelihood of an action taking place in the real world and distinguish between past, present, and future timeframes). Various non-limiting examples of process 1440 classifying the action to a likelihood category will now be described with reference to FIGS. 15B-15H.

As illustrated in FIG. 15B, likelihood model 1504B generates an output comprising likelihood category 1508 in response to identifying likelihood tokens 1526. Likelihood category 1508 may indicate the likelihood of an action associated with action tokens 1518 occurring, based on linguistic patterns in text document 1502. In some embodiments, likelihood category 1508 may be classified as one of a plurality of likelihood categories including low likelihood category 1522A, intermediate likelihood category 1522B, and high likelihood category 1522C.

As shown in the examples of FIGS. 15F-15H, action tokens 1518A-1518Q from respective text sentences or statements 1524A-1524Q may each be classified by likelihood model 1504B to one of low likelihood category 1522A, intermediate likelihood category 1522B, and high likelihood category 1522C. For example, as shown in FIG. 15F, action token 1518A ("met") from text statement 1524A ("I dreamt that we met") may be classified to low likelihood category 1522A, indicating that there is a low likelihood that the meeting action associated with action token 1518A occurred. It shall be noted that the classification of the remaining action tokens 1518A-1518Q as shown in FIGS. 15F-15H may be interpreted analogously.

In some embodiments, as depicted in FIGS. 15B-15E, the text processing model groups linguistic pattern searches 1520 into three distinct linguistic pattern searches subgroups: linguistic pattern searches subgroup 1520A, linguistic pattern searches subgroup 1520B, and linguistic pattern searches subgroup 1520C. In some embodiments, as illustrated in FIGS. 15B-15E, each linguistic pattern searches subgroup 1520A, 1520B, 1520C, may be associated with one of likelihood categories 1522A, 1522B, 1522C. For example, as illustrated in FIGS. 15B-15E, likelihood categories may include low likelihood category 1522A, intermediate likelihood 1522B, and high likelihood 1522C. The actions associated with action tokens 1518 are classified into one of these categories depending on which group the respective linguistic pattern search falls into. If the search is grouped into low likelihood category 1522A, the action is classified as low likelihood; similarly, if it is in the intermediate or high likelihood categories 1522B and 1522C, the action is classified accordingly.

In some embodiments, when there are conflicting likelihood categories between different linguistic pattern searches 1520, process 1440 may function to receive user input that may be used to resolve the ambiguity. For instance, a user may specify, via a user interface, whether the action associated with action token(s) 1518 should correspond to the likelihood category of a specific pattern search, and/or whether the action should correspond to another likelihood category. Based on this input, the action associated with action token(s) 1518 may be classified into the selected likelihood category. Additionally, or alternatively, process 1440 may function to automatically determine which executed linguistic pattern search indicates a higher likelihood and may classify the action associated with action token(s) 1518 accordingly. In some embodiments, process 1440 may function to automatically determine and classify the action associated with action token(s) 1518 if user input to resolve the ambiguity is not received.

Referring to FIG. 14, in some embodiments, method 1400 may include process 1450. Process 1450 may classify, via a domain classification model, the text document to a respective domain. The term "domain," as generally used herein, may refer to a specific area of application or field where the text analysis of text document 1502 is being applied. The term "domain classification model," as used herein, may refer to a model, or an ensemble of models, that may function to classify text document 1502 into one or more of a plurality of domains. Various non-limiting examples of process 1450 classifying the text document to a respective domain will now be described with reference to FIGS. 15A and 15I.

Figure 15I:
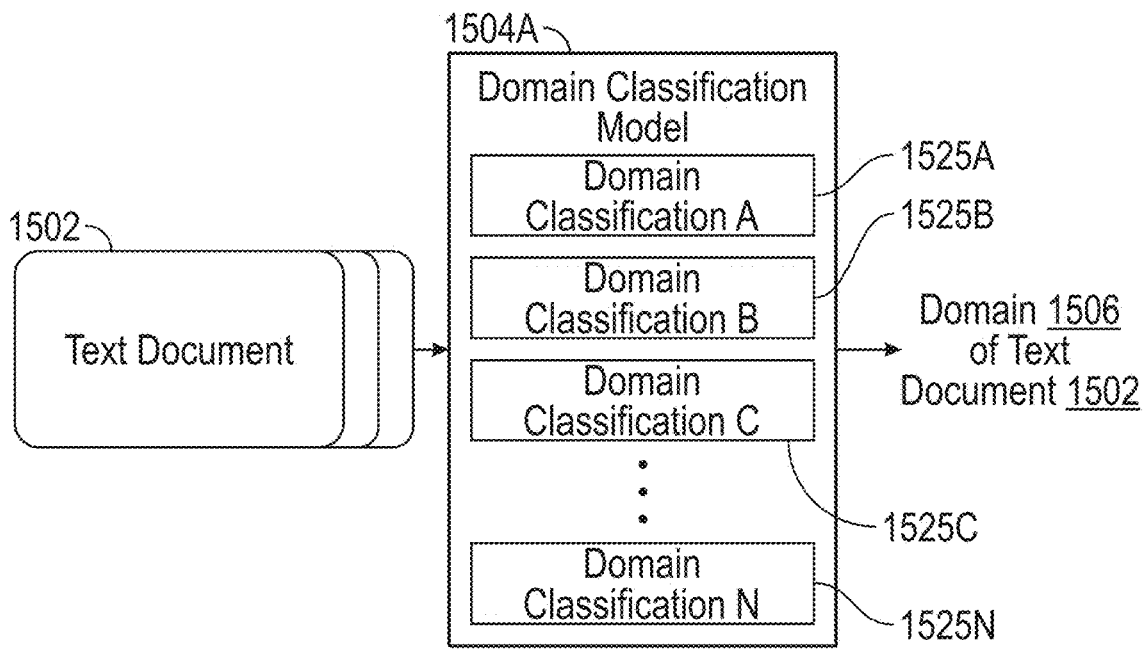
FIG. 15I illustrates an example of classifying a text document to a domain with a domain classification model, according to some embodiments of the present technology.

As illustrated in FIGS. 15A and 15I, text analytics component 1504 includes domain classification model 1504A. Domain classification model 1504A, in some embodiments, generates an output comprising domain 1506 in response to receiving an input of text document 1502. Domain classification model 1504A may categorize text document 1502 into one or more of a plurality of domain classifications 1525A, 1525B, 1525C, . . . , 1525N, as shown in FIG. 15I. Each domain classification may represent a distinct field of application for the analysis of text document 1502 including, but not limited to: child safety, financial fraud detection, law enforcement evidence collection, marketing and retail, customer service, healthcare, and corporate security.

In some embodiments, domain classification model 1504A may include a distinct domain classification model for each domain classification which outputs a domain 1506 comprising one or more of a plurality of domain categories of text document 1502. For example, if the domain classification model is specific to child safety, the text document 1502 is further classified by domain classification model 1504A into one or more child safety categories within that child safety domain. This may ensure that document 1502 is accurately categorized based on its content and the specific threat detection needs of the child safety domain.

Referring to FIG. 14, in some embodiments, method 1400 may include process 1460. Process 1460 may compute, via an activity prioritization model, a priority value of the action described in the text document based on an input of the likelihood category and the respective domain. The term "priority value," as generally used herein, may refer to a numerical score assigned to an action associated with action token(s) 1518, indicating a degree of urgency of the action that may indicate whether the action may require immediate attention or further investigation. The term "activity prioritization model," as used herein, may refer to a model, or an ensemble of models, that may compute the priority value. Activity prioritization model 1512 may sometimes be referred to herein as activity priority model 1512. Various non-limiting examples of process 1460 computing a priority value will now be described with reference to FIGS. 15A and 15J-15L.

Figure 15J:
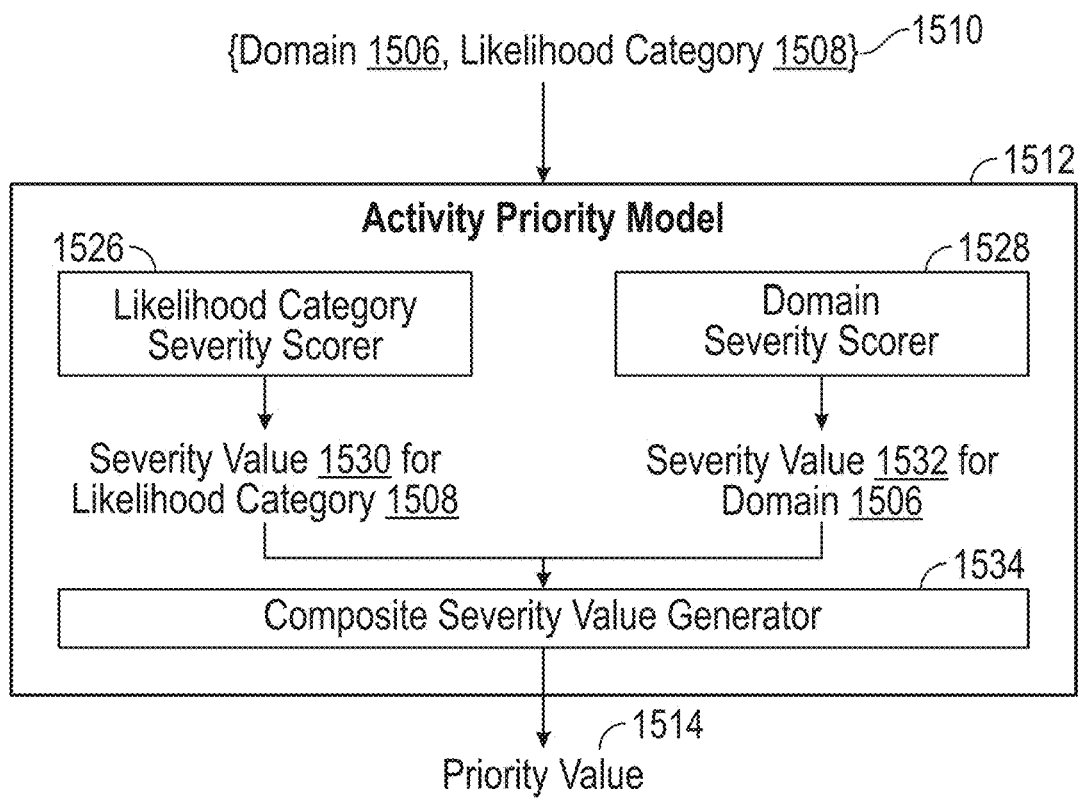
FIG. 15J illustrates an example of computing a priority value with an activity priority model, according to some embodiments of the present technology.

As illustrated in FIGS. 15A and 15J, process 1460 provides a priority model input 1510 comprising domain 1506 and likelihood category 1508 to activity priority model 1512. In turn, activity priority model 1512 computes priority value 1514 in response to (e.g., based on) receiving priority model input 1510. In some embodiments, priority value 1514 may reflect a domain-specific prioritization of an action discussed in text document 1502 based on the likelihood of that action occurring. For example, if text document 1502 discusses a likely physical meeting between a suspect and a potential child victim in a child safety domain, priority value 1514 may comprise a high value reflecting a potential severity or threat of the discussed likely physical meeting in a highly sensitive domain (e.g., child safety).

As shown in FIG. 15J, activity priority model 1512 may include likelihood category severity scorer 1526. Likelihood category severity scorer 1526 generates an output comprising severity value 1530 for likelihood category 1508 in response to (e.g., based on) an input comprising likelihood category 1508. As used herein, the term "severity value" for likelihood category 1508 may refer to a numerical score associated with likelihood category 1508 reflecting the relative importance or urgency associated with the likelihood of an action associated with action tokens 1518 occurring.

In some embodiments, as shown in FIG. 15K, likelihood category severity scorer 1526 may function to convert likelihood category 1508 to severity value 1530 by looking up a corresponding record in likelihood category severity lookup table 1536 that associates each likelihood category with a severity value. For instance, in the example of FIG. 15K, if likelihood category 1508 is classified as intermediate likelihood, likelihood category severity scorer 1526 may output a severity value 1530 of "0.5" based on the corresponding row comprising intermediate likelihood category 1522B in likelihood category severity lookup table 1536. It shall be noted that the example shown in FIG. 15K is not intended to be limiting, and likelihood category severity lookup table 1536 may comprise values other than those in the illustrated example.

As shown in FIG. 15J, activity priority model 1512 may include domain severity scorer 1528. Domain severity scorer 1528 generates an output comprising severity value 1532 for domain 1506 in response to (e.g., based on) an input comprising domain 1506. As used herein, the term "severity value" for domain 1506 may refer to a numerical score associated with domain 1506 reflecting the relative importance or urgency associated with the domain of an action associated with action tokens 1518.

In some embodiments, as shown in FIG. 15L, domain severity scorer 1528 may function to convert domain 1506 to severity value 1532 by looking up a corresponding record in domain severity lookup table 1538 that associates each domain classification with a severity value. For instance, in the example of FIG. 15L, if domain 1506 includes "domain classification B" 1525B, domain severity scorer 1528 may output a severity value 1532 of "0.33" based on the corresponding row comprising "domain classification B" 1525B in domain severity lookup table 1538. It shall be noted that the example shown in FIG. 15L is not intended to be limiting, and domain severity lookup table 1538 may comprise values other than those in the illustrated example.

As shown in FIG. 15J, activity priority model 1512 may include composite severity value generator 1534. Composite severity value generator 1534 computes an output comprising priority value 1514 in response to (e.g., based on) an input comprising both severity value 1530 for likelihood category 1508 and severity value 1532 for domain 1506. In some embodiments, composite severity value generator 1534 may compute priority value 1514 as a weighted sum of severity value 1530 and severity value 1532 based on applying a likelihood category severity value weight to severity value 1530 and a domain severity value weight to severity value 1532.

Referring to FIG. 14, in some embodiments, method 1400 may include process 1470. Process 1470 may generate a priority summary artifact that visually prioritizes the text document over one or more other text documents when the priority value of the action satisfies a pre-defined maximum priority threshold value. The term "priority summary artifact," as generally used herein, may refer to a data object comprising one or more visualizations that may be displayed in a user interface to organize and visually emphasize urgent or important text documents 1502 and/or the actions associated with action tokens 1518 in text document(s) 1502. The term "maximum priority threshold value," as used herein, may refer to a predefined priority value boundary (e.g., a minimum priority value) that must be met or exceeded by a computed priority value 1514 to classify the corresponding action(s) as warranting heightened attention or response. Various non-limiting examples of process 1470 generating a priority summary artifact will now be described with reference to FIGS. 15O-15Q.

Figure 15O:
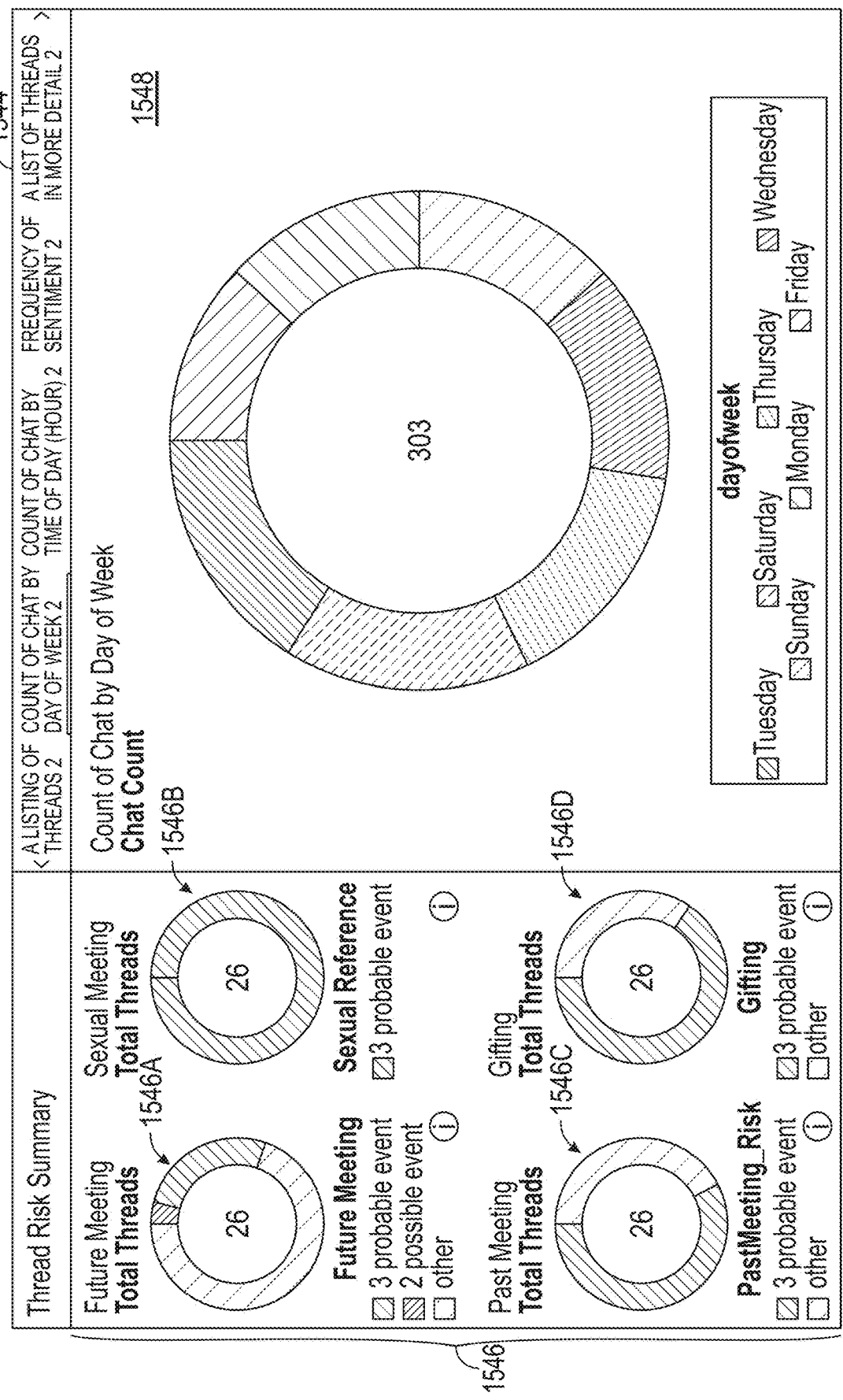
Figure 15P:
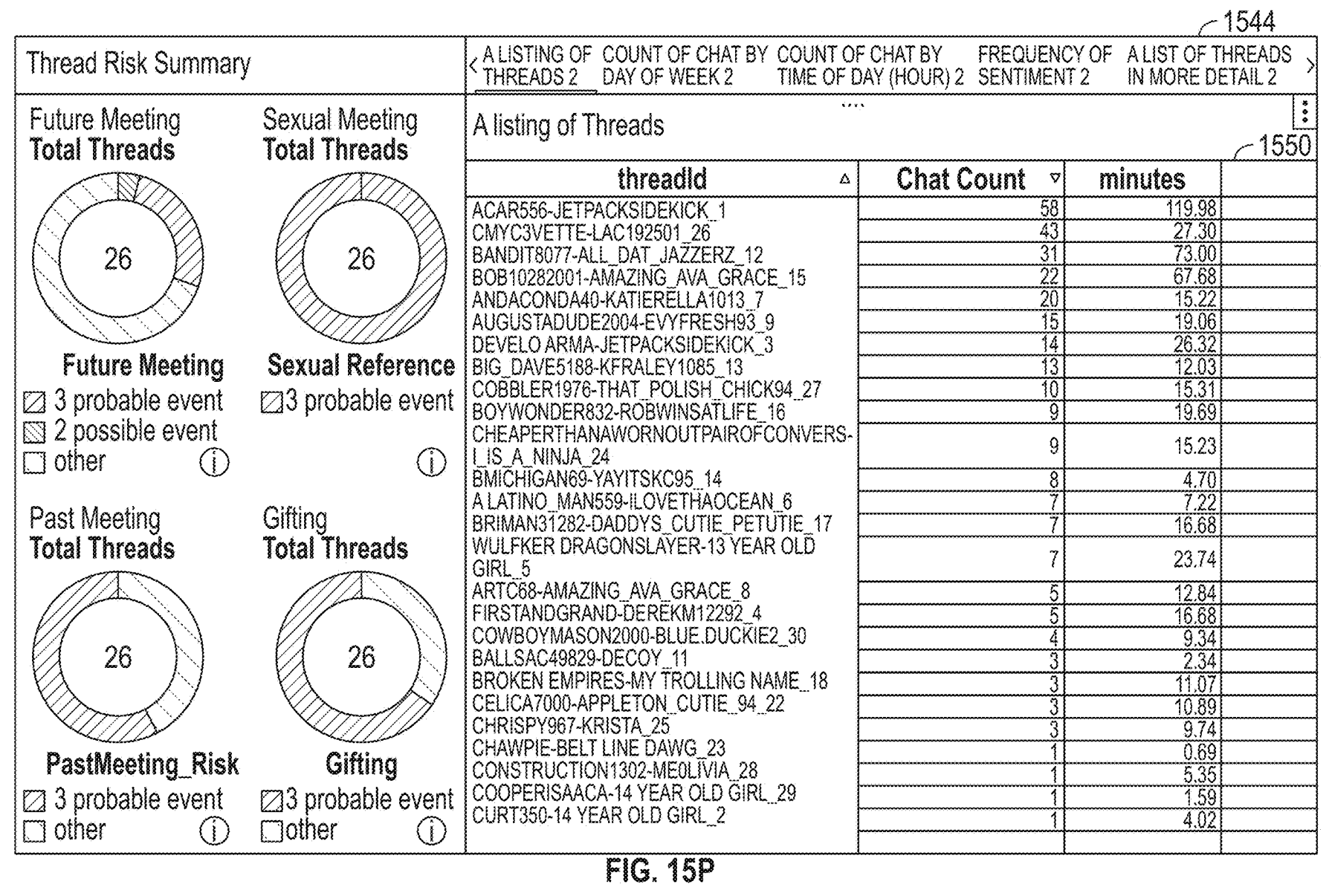

As shown in FIGS. 15O and 15P, process 1470 may generate one or more priority summary artifacts 1546 designed to highlight the most urgent or important text documents 1502 based on their corresponding computed priority values 1514. In some embodiments, when a text document 1502 is visually prioritized, it may be displayed more prominently in priority summary artifact(s) 1546 compared to text documents that do not meet the maximum priority threshold, ensuring that critical text documents may receive immediate attention. Priority summary artifact(s) 1546 may each include an infographic visualization object that may highlight or otherwise depict relative priority values 1514 of one or more text documents 1502. In some embodiments, as illustrated in FIGS. 15O and 15P, process 1470 may function to implement user interface 1544 to surface priority summary artifact(s) 1546. In some non-limiting examples, priority summary artifact(s) 1546 may comprise visualization objects including, but not limited to, donut charts, pie charts, bar charts, tables, and/or other suitable graphical visualization objects. In one or more embodiments, visually prioritizing text document 1502 in priority summary artifact(s) 1546 may include applying a distinct coloring, shading, highlighting, font type, font style, and/or any other visually distinguishing feature to instances or references to text document 1502 in priority summary artifact(s) 1546. In some embodiments, if the priority value 1514 of the action does not meet the threshold, the priority summary artifact does not give the corresponding text document 1502 higher visual prominence.

As a non-limiting example, as shown in FIGS. 15O and 15P process 1470 may generate priority summary artifacts 1546A, 1546B, 1546C, and 1546D, each comprising a donut chart for a distinct domain or action type in a child safety domain. For instance, as shown in FIGS. 15O and 15P, priority summary artifact 1546A may depict relative priority levels of text documents 1502 including text discussing "future meeting" activities in a child safety domain, priority summary artifact 1546B may depict relative priority levels of text documents 1502 including text discussing "sexual meeting" activities in a child safety domain, where the term "sexual meeting" in the context of the child safety domain may refer to an age-inappropriate meeting with a child (e.g., child grooming) that may additionally involve age-inappropriate, objectionable, and/or unseemly material and/or references for potentially abusive, exploitative, or illegal purposes.

Additionally, in the example shown in FIGS. 15O and 15P, priority summary artifact 1546C may depict relative priority levels of text documents 1502 including text discussing "past meeting" activities in a child safety domain, and priority summary artifact 1546D may depict relative priority levels of text documents 1502 including text discussing "past meeting" activities in a child safety domain. As illustrated in the example of FIGS. 15O and 15P, the shading or color in each chart segment of priority summary artifacts 1546A, 1546B, 1546C, and 1546D may visually distinguish probable events, possible events, and other events. In this example, process 1470 may identify probable events based on the priority value of the corresponding action satisfying the pre-defined maximum priority threshold value.

As shown in FIG. 15O, user interface 1544 may additionally function to display a text document distribution visualization 1548 for displaying a distribution of text documents according to different time intervals or other distribution criteria. For example, as illustrated in FIG. 15O, text document distribution visualization 1548 may include a donut chart (entitled "Count of Chat by Day of Week" in the example of FIG. 15O) that displays the distribution of text documents (e.g., "chats") according to the days of the week each text document may be associated with. In the example of FIG. 15O, user interface 1544 may additionally or alternatively include one or more text document distribution visualizations 1548 that display the distribution of text documents according to one or more other time intervals, such as time of day. In some embodiments, user interface 1544 may include one or more interface controls corresponding to the one or more text document distribution visualizations 1548 that may enable a user to selectively display the corresponding text document distribution visualization 1548.

Additionally, as shown in the non-limiting example of FIG. 15P, user interface 1544 may function to display a text document group table 1550 that may function to display one or more groups of text documents. In some embodiments, text document group table 1550 may comprise a table including one or more rows corresponding to the one or more groups of text documents. As illustrated in the non-limiting example of FIG. 15P, text document group table 1550 may include a title, such as "A listing of Threads" as depicted. In the illustrated example, text document group table 1550 may function to display text documents (e.g., "chats") grouped and/or arranged by thread identification (e.g., the "threadID" column of the in FIG. 15P). In this example, each text document may include a chat message within a chat thread, wherein each chat thread may include one or more text documents (chat messages), and each chat thread may be identified by a distinct thread ID. In some embodiments, each row of text document group table 1550 may correspond to a distinct text document group, such as a distinct chat thread in the example of FIG. 15P. Text document group table 1550 may include one or more columns corresponding to one or more attributes of the displayed text document groups including, but not limited to, a text document group identifier column (e.g., the first column of chat thread IDs entitled "threadId" in the example of FIG. 15P), a text document quantity column (e.g., the second column entitled "Chat Count" in the example of FIG. 15P), and a text document temporal column (e.g., the third column entitled "minutes" in the example of FIG. 15P). In some embodiments, user interface 1544 may enable sorting or arranging of text document group table 1550 according to the attributes of one or more columns of text document group table 1550.

Figure 15Q:
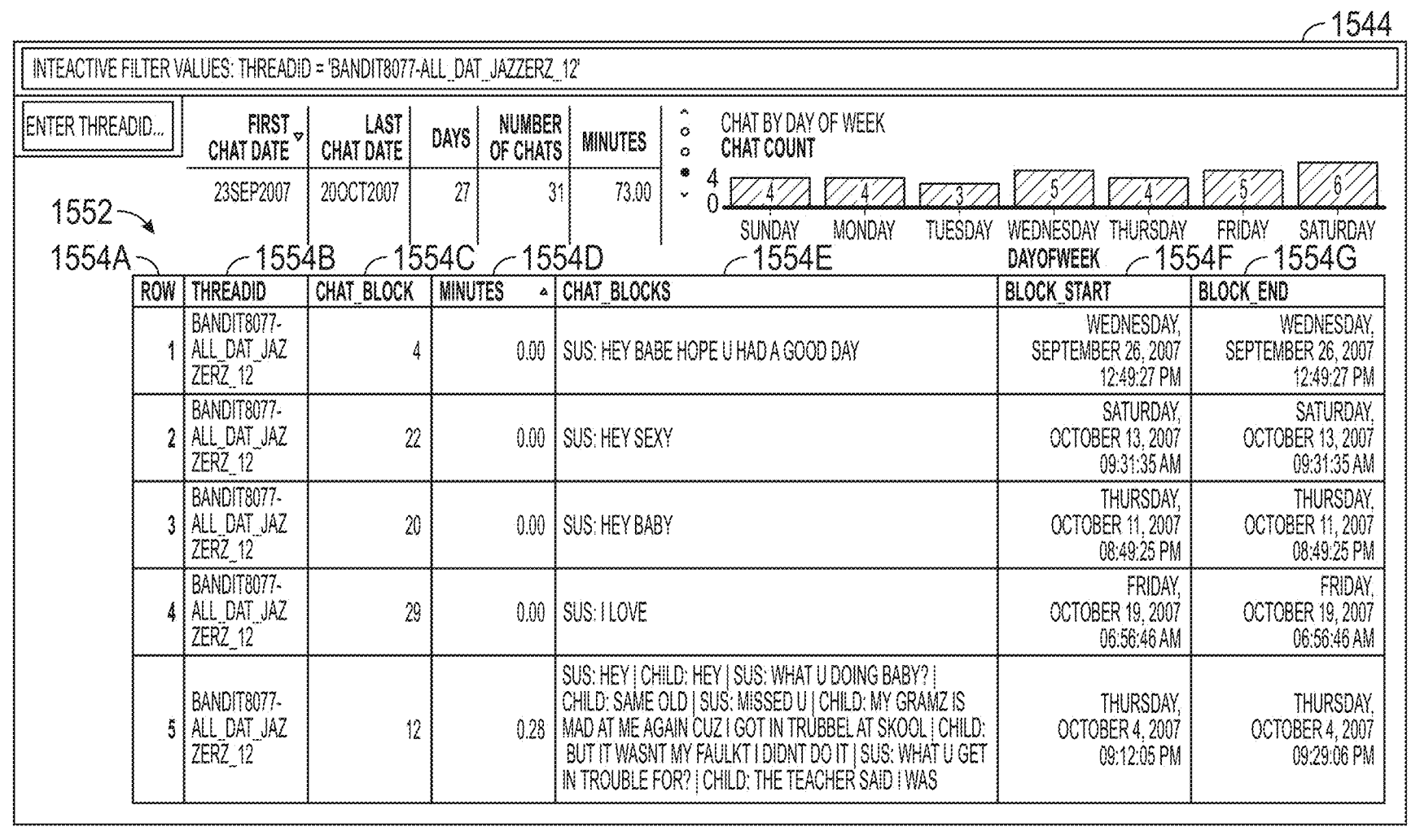

As illustrated in FIG. 15Q, user interface 1544 may additionally include a text document display table 1552 comprising one or more rows for surfacing data and/or metadata of one or more corresponding text documents. In some embodiments, text document display table 1552 may function to display one or more text documents from a distinct text document group. In the non-limiting example depicted in FIG. 15Q, each row of text document display table 1552 may correspond to a record of a distinct text document. Additionally, as shown in FIG. 15Q, text document display table 1552 may further include one or more columns corresponding to one or more attributes of the displayed text documents including, but not limited to, a row index column 1554A, a text document group identifier column 1554B, a text document sequence identifier column 1554C, a text document duration column 1554D, a text document content column 1554E, a text document start timestamp column 1554F, and a text document end timestamp column 1554G. Each cell in a distinct row and column of text document display table 1552 may include a value corresponding to the attribute of the distinct column for the text document of the distinct row.

It shall be noted that the system and methods described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:

obtaining a text document that includes text describing an action performable in the real world by an author associated with the text;

extracting, via a text processing model, one or more action tokens that represent the action described in the text document, wherein extracting the one or more action tokens from the text document includes identifying a modal verb from a respective sentence within the text document;

executing, via the text processing model, a plurality of linguistic pattern searches that search the text document for one or more likelihood tokens associated with the one or more action tokens, wherein the plurality of linguistic pattern searches includes a temporal-based hypothetical conditional pattern search, wherein searching the text document for the one or more likelihood tokens includes searching for one or more tokens within the respective sentence of the text document that satisfies token likelihood search criteria of the temporal-based hypothetical conditional pattern search, wherein the token likelihood search criteria is satisfied when:
  a token within the respective sentence of the text document matches to a set of conditional words, and
  the token that matched to the set of conditional words is detected in a position relative to the modal verb satisfying one or more concept rules of the temporal-based hypothetical conditional search pattern; and wherein the text processing model groups the plurality of linguistic pattern searches into a plurality of likelihood categories, including:
  a first likelihood category of the plurality of likelihood categories that includes a first subgroup of linguistic pattern searches of the plurality of linguistic pattern searches,
  a second likelihood category of the plurality of likelihood categories that includes a second subgroup of linguistic pattern searches of the plurality of linguistic pattern searches, and
  a third likelihood category of the plurality of likelihood categories that includes a third subgroup of linguistic pattern searches of the plurality of linguistic pattern searches, wherein the first likelihood category, the second likelihood category, and the third likelihood category are distinct from each other, where each of the plurality of likelihood categories level of likelihood is associated with a different level of likelihood from one another; and wherein the first subgroup, the second subgroup, and the third subgroup of linguistic pattern searches are distinct from each other;

classifying, via the text processing model, the action to the first likelihood category based on a respective linguistic pattern search of the plurality of linguistic pattern searches that identified the one or more likelihood tokens belonging to the first subgroup of linguistic pattern searches, wherein the first likelihood category indicates a likelihood of the action taking place in the real world, wherein the likelihood of the action represents a probability of the action being performed by the author in the real world;

classifying, via a domain classification model, the text document to a respective domain;

computing, via an activity prioritization model, a priority value of the action described in the text document based on an input of the first likelihood category and the respective domain; and generating a priority summary artifact that visually prioritizes the text document over one or more other text documents when the priority value of the action satisfies a pre-defined maximum priority threshold value.

2. The computer-program product according to claim 1, wherein:
the activity prioritization model computes the priority value of the action by:
determining a severity value of the first likelihood category,
determining a severity value of the respective domain, and
calculating the priority value of the action using a weighted sum calculation that applies a first weight value to the severity value of the respective domain and a second weight value to the severity value of the first likelihood category.

3. The computer-program product according to claim 1, wherein:
the author of the text document describes and performs the action,
the plurality of likelihood categories include a low likelihood category, an intermediate likelihood category, and a high likelihood category, and
classifying the action to a likelihood category includes:
determining if the respective linguistic pattern search that identified the one or more likelihood tokens is grouped into the low likelihood category, the intermediate likelihood category, or the high likelihood category,
classifying the action to the low likelihood category when the respective linguistic pattern search is determined to be grouped into the low likelihood category,
classifying the action to the intermediate likelihood category when the respective linguistic pattern search is determined to be grouped into the intermediate likelihood category, and
classifying the action to the high likelihood category if the respective linguistic pattern search is determined to be grouped into the high likelihood category.

4. The computer-program product according to claim 1, wherein:
the plurality of linguistic pattern searches search for linguistic cues that indicate an intent of the author across different timeframes,
searching the text document for the one or more likelihood tokens includes searching the text document for one or more low likelihood tokens, and
searching the text document for the one or more low likelihood tokens at least includes:
searching the text document for one or more tokens associated with a counterfactual conditional;
searching the text document for one or more tokens associated with a subjunctive expression; or
searching the text document for one or more tokens associated with a present-time hypothetical condition.

5. The computer-program product according to claim 1, wherein:
the action has been planned by the author,
searching the text document for the one or more likelihood tokens includes searching the text document for one or more intermediate likelihood tokens, and
searching the text document for the one or more intermediate likelihood tokens at least includes:
searching the text document for one or more tokens associated with a future-time hypothetical condition;
searching the text document for one or more tokens associated with a future-time predictive conditional;
searching the text document for one or more tokens associated with an anticipatory expression; or
searching the text document for one or more tokens associated with a modal expression.

6. The computer-program product according to claim 1, wherein:
the first likelihood category indicates the likelihood of the action taking place in the real world from a perspective of an author of the text document,
searching the text document for the one or more likelihood tokens includes searching the text document for one or more high likelihood tokens, and
searching the text document for the one or more high likelihood tokens at least includes:
searching the text document for one or more tokens associated with an expression of intent;
searching the text document for one or more tokens associated with a past-time expression;
searching the text document for one or more tokens associated with a present-time expression; or
searching the text document for one or more tokens associated with a future-time expression.

7. The computer-program product according to claim 1, wherein:
the action is a physical action, and
the respective linguistic pattern search identifies the one or more likelihood tokens by:
searching a sentence of the text document for one or more tokens that satisfy pre-defined token likelihood search criteria.

8. The computer-program product according to claim 1, wherein:
the text processing model groups the plurality of linguistic pattern searches into a plurality of likelihood categories,
computing the priority value of the action at least includes converting the first likelihood category to a severity value, and
the activity prioritization model converts the first likelihood category to the severity value by:
searching for a record corresponding to the first likelihood category in a lookup data structure that associates the plurality of likelihood categories with a respective severity value, and
converting the first likelihood category to the respective severity value defined in the record that corresponds to the first likelihood category.

9. The computer-program product according to claim 1, wherein:
the domain classification model is configured to classify the text document into a plurality of domains,
computing the priority value of the action at least includes converting the respective domain to a severity value, and
the activity prioritization model converts the respective domain to the severity value by:
searching for a record corresponding to the respective domain in a lookup data structure that associates the plurality of domains with a respective severity value, and
converting the respective domain to the respective severity value defined in the record that corresponds to the respective domain.

10. The computer-program product according to claim 1, wherein the priority summary artifact forgoes visually prioritizing the text document over the one or more other text documents when the priority value of the action does not satisfy the pre-defined maximum priority threshold value.

11. The computer-program product according to claim 1, wherein:
the text document is a chat conversation,
the action described in the text document relates to a discussion of a physical meeting,
the first likelihood category associated with the action is one of: a low likelihood category, an intermediate likelihood category, or a high likelihood category,
the respective domain of the text document corresponds to a child safety domain, and
the priority value of the action represents a severity of the physical meeting.

12. The computer-program product according to claim 1, wherein:
detecting the one or more action tokens includes detecting one or more verbs in the text document, and
the text processing model uses part-of-speech tagging to detect the one or more verbs in the text document.

13. The computer-program product according to claim 1, wherein:
the domain classification model is a child safety domain classification model, and
classifying the text document to the respective domain includes classifying the text document to one of a plurality of child safety categories associated with the child safety domain classification model.

14. The computer-program product according to claim 1, wherein:
the priority value of the action described in the text document satisfies the pre-defined maximum priority threshold value, and
visually prioritizing the text document over the one or more other text documents includes:
displaying an entry corresponding to the text document at a higher prominence than a text document that does not satisfy the pre-defined maximum priority threshold value.

15. The computer-program product according to claim 1, wherein:
the one or more likelihood tokens includes a first set of likelihood tokens that were identified by the respective linguistic pattern search and a second set of likelihood tokens that were identified by a second respective linguistic pattern search of the plurality of linguistic pattern searches,
the first likelihood category of the respective linguistic pattern search is different from a likelihood category associated with the second respective linguistic pattern search, and
classifying the action includes:
receiving disambiguation user input that indicates whether the action described in the text document corresponds to the first likelihood category associated with the respective linguistic pattern search or the likelihood category associated with the second respective linguistic pattern search, and
in response to detecting the disambiguation user input:
in accordance with a determination that the disambiguation user input included a selection of the first likelihood category associated with the respective linguistic pattern search, classifying the action to the first likelihood category associated with the respective linguistic pattern search, and
in accordance with a determination that the disambiguation user input included a selection of the likelihood category associated with the second respective linguistic pattern search, classifying the action to the likelihood category associated with the second respective linguistic pattern search.

16. The computer-program product according to claim 1, wherein:
the one or more likelihood tokens includes a first set of likelihood tokens that were identified by the respective linguistic pattern search and a second set of likelihood tokens that were identified by a second respective linguistic pattern search of the plurality of linguistic pattern searches,
the first likelihood category of the respective linguistic pattern search is different from a likelihood category associated with the second respective linguistic pattern search, and
classifying the action includes:
determining if the first likelihood category of the respective linguistic pattern search indicates a higher likelihood than the likelihood category associated with the second respective linguistic pattern search,
classifying the action to the first likelihood category associated with the respective linguistic pattern search if the first likelihood category of the respective linguistic pattern search is determined to have the higher likelihood, and
classifying the action to the likelihood category associated with the second respective linguistic pattern search if the first likelihood category of the respective linguistic pattern search is determined to not have the higher likelihood.

17. A computer-implemented method comprising:
obtaining a text document that includes text describing an action performable in the real world by an author associated with the text;
extracting, via a text processing model, one or more action tokens that represent the action described in the text document, wherein extracting the one or more action tokens from the text document includes identifying a modal verb from a respective sentence within the text document;
executing, via the text processing model, a plurality of linguistic pattern searches that search the text document for one or more likelihood tokens associated with the one or more action tokens, wherein the plurality of linguistic pattern searches includes a temporal-based hypothetical conditional pattern search, wherein searching the text document for the one or more likelihood tokens includes searching for one or more tokens within the respective sentence of the text document that satisfies token likelihood search criteria of the temporal-based hypothetical conditional pattern search, wherein the token likelihood search criteria is satisfied when:
a token within the respective sentence of the text document matches to a set of conditional words, and
the token that matched to the set of conditional words is detected in a position relative to the modal verb satisfying one or more concept rules of the temporal-based hypothetical conditional search pattern; and
wherein the text processing model groups the plurality of linguistic pattern searches into a plurality of likelihood categories, including:

a first likelihood category of the plurality of likelihood categories that includes a first subgroup of linguistic pattern searches of the plurality of linguistic pattern searches, a second likelihood category of the plurality of likelihood categories that includes a second subgroup of linguistic pattern searches of the plurality of linguistic pattern searches, and a third likelihood category of the plurality of likelihood categories that includes a third subgroup of linguistic pattern searches of the plurality of linguistic pattern searches, wherein the first likelihood category, the second likelihood category, and the third likelihood category are distinct from each other, where each of the plurality of likelihood categories level of likelihood is associated with a different level of likelihood from one another, and wherein the first subgroup, the second subgroup, and the third subgroup of linguistic pattern searches are distinct from each other;

classifying, via the text processing model, the action to the first likelihood category based on a respective linguistic pattern search of the plurality of linguistic pattern searches that identified the one or more likelihood tokens belonging to the first subgroup of linguistic pattern searches, wherein the likelihood category indicates a likelihood of the action taking place in the real world, wherein the likelihood of the action represents a probability of the action being performed by the author in the real world, and classifying, via a domain classification model, the text document to a respective domain;

computing, via an activity prioritization model, a priority value of the action described in the text document based on an input of the first likelihood category and the respective domain; and generating a priority summary artifact that visually prioritizes the text document over one or more other text documents when the priority value of the action satisfies a pre-defined maximum priority threshold value.

18. The computer-implemented method according to claim 17, wherein:

the activity prioritization model computes the priority value of the action by:

determining a severity value of the first likelihood category, determining a severity value of the respective domain, and calculating the priority value of the action using a weighted sum calculation that applies a first weight value to the severity value of the respective domain and a second weight value to the severity value of the first likelihood category.

19. The computer-implemented method according to claim 17, wherein:

the author of the text document describes and performs the action, the plurality of likelihood categories include a low likelihood category, an intermediate likelihood category, and a high likelihood category, and classifying the action to a likelihood category includes:

determining if the respective linguistic pattern search that identified the one or more likelihood tokens is grouped into the low likelihood category, the intermediate likelihood category, or the high likelihood category, classifying the action to the low likelihood category when the respective linguistic pattern search is determined to be grouped into the low likelihood category, classifying the action to the intermediate likelihood category when the respective linguistic pattern search is determined to be grouped into the intermediate likelihood category, and classifying the action to the high likelihood category if the respective linguistic pattern search is determined to be grouped into the high likelihood category.

20. The computer-implemented method according to claim 17, wherein:

the plurality of linguistic pattern searches search for linguistic cues that indicate an intent of the author across different timeframes, searching the text document for the one or more likelihood tokens includes searching the text document for one or more low likelihood tokens, and searching the text document for the one or more low likelihood tokens at least includes:

searching the text document for one or more tokens associated with a counterfactual conditional;

searching the text document for one or more tokens associated with a subjunctive expression; or searching the text document for one or more tokens associated with a present-time hypothetical condition.

21. The computer-implemented method according to claim 17, wherein:

the action has been planned by the author, searching the text document for the one or more likelihood tokens includes searching the text document for one or more intermediate likelihood tokens, and searching the text document for the one or more intermediate likelihood tokens at least includes:

searching the text document for one or more tokens associated with a future-time hypothetical condition;

searching the text document for one or more tokens associated with a future-time predictive conditional;

searching the text document for one or more tokens associated with an anticipatory expression; or searching the text document for one or more tokens associated with a modal expression.

22. The computer-implemented method according to claim 17, wherein:

the first likelihood category indicates the likelihood of the action taking place in the real world from a perspective of an author of the text document, searching the text document for the one or more likelihood tokens includes searching the text document for one or more high likelihood tokens, and searching the text document for the one or more high likelihood tokens at least includes:

searching the text document for one or more tokens associated with an expression of intent;

searching the text document for one or more tokens associated with a past-time expression;

searching the text document for one or more tokens associated with a present-time expression; or searching the text document for one or more tokens associated with a future-time expression.

23. The computer-implemented method according to claim 17, wherein:
the action is a physical action, and
the respective linguistic pattern search identifies the one or more likelihood tokens by:
searching a sentence of the text document for one or more tokens that satisfy pre-defined token likelihood search criteria.

24. A computer-implemented system comprising:
one or more processors;
a memory; and
a computer-readable medium operably coupled to the one or more processors, the computer-readable medium having computer-readable instructions stored thereon that, when executed by the one or more processors, cause a computing device to perform operations comprising:
obtaining a text document that includes text describing an action performable in the real world by an author associated with the text;
extracting, via a text processing model, one or more action tokens that represent the action described in the text document, wherein extracting the one or more action tokens from the text document includes identifying a modal verb from a respective sentence within the text document;
executing, via the text processing model, a plurality of linguistic pattern searches that search the text document for one or more likelihood tokens associated with the one or more action tokens, wherein the plurality of linguistic pattern searches includes a temporal-based hypothetical conditional pattern search, wherein searching the text document for the one or more likelihood tokens includes searching for one or more tokens within the respective sentence of the text document that satisfies token likelihood search criteria of the temporal-based hypothetical conditional pattern search, wherein the token likelihood search criteria is satisfied when:
a token within the respective sentence of the text document matches to a set of conditional words, and
the token that matched to the set of conditional words is detected in a position relative to the modal verb satisfying one or more concept rules of the temporal-based hypothetical conditional search pattern; and
wherein the text processing model groups the plurality of linguistic pattern searches into a plurality of likelihood categories, including:
a first likelihood category of the plurality of likelihood categories that includes a first subgroup of linguistic pattern searches of the plurality of linguistic pattern searches,
a second likelihood category of the plurality of likelihood categories that includes a second subgroup of linguistic pattern searches of the plurality of linguistic pattern searches, and
a third likelihood category of the plurality of likelihood categories that includes a third subgroup of linguistic pattern searches of the plurality of linguistic pattern searches, wherein the first likelihood category, the second likelihood category, and the third likelihood category are distinct from each other, where each of the plurality of likelihood categories level of likelihood is associated with a different level of likelihood from one another, and wherein the first subgroup, the second subgroup, and the third subgroup of linguistic pattern searches are distinct from each other;
classifying, via the text processing model, the action to the first likelihood category based on a respective linguistic pattern search of the plurality of linguistic pattern searches that identified the one or more likelihood tokens belonging to the first subgroup of linguistic pattern searches, wherein the likelihood category indicates a likelihood of the action taking place in the real world, wherein the likelihood of the action represents a probability of the action being performed by the author in the real world, and
classifying, via a domain classification model, the text document to a respective domain;
computing, via an activity prioritization model, a priority value of the action described in the text document based on an input of the likelihood category and the respective domain; and
generating a priority summary artifact that visually prioritizes the text document over one or more other text documents when the priority value of the action satisfies a pre-defined maximum priority threshold value.

25. The computer-implemented system according to claim 24, wherein:
computing the priority value of the action at least includes converting the first likelihood category to a severity value, and
the activity prioritization model converts the first likelihood category to the severity value by:
searching for a record corresponding to the first likelihood category in a lookup data structure that associates the plurality of likelihood categories with a respective severity value, and
converting the first likelihood category to the respective severity value defined in the record that corresponds to the first likelihood category.

26. The computer-implemented system according to claim 24, wherein:
the domain classification model is configured to classify the text document into a plurality of domains,
computing the priority value of the action at least includes converting the respective domain to a severity value, and
the activity prioritization model converts the respective domain to the severity value by:
searching for a record corresponding to the respective domain in a lookup data structure that associates the plurality of domains with a respective severity value, and
converting the respective domain to the respective severity value defined in the record that corresponds to the respective domain.

27. The computer-implemented system according to claim 24, wherein the priority summary artifact forgoes visually prioritizing the text document over the one or more other text documents when the priority value of the action does not satisfy the pre-defined maximum priority threshold value.

28. The computer-implemented system according to claim 24, wherein:
the text document is a chat conversation,
the action described in the text document relates to a discussion of a physical meeting, the first likelihood category associated with the action is one of: a low likelihood category, an intermediate likelihood category, or a high likelihood category, the respective domain of the text document corresponds to a child safety domain, and the priority value of the action represents a severity of the physical meeting.

* * * * *